United States Patent
Howorka et al.

(10) Patent No.: US 8,548,892 B2
(45) Date of Patent: Oct. 1, 2013

(54) METHOD AND APPARATUS FOR DERIVING BENCHMARKS FOR TRADING INSTRUMENTS

(75) Inventors: Edward R. Howorka, Morris Plains, NJ (US); David Jifeng Liu, East Rutherford, NJ (US); Jeffrey Edward Power, Rockaway, NJ (US); Nasir Ahmed Zubairi, New York, NY (US); Neena Jain, South Plainfield, NJ (US)

(73) Assignee: EBS Group Limited, London (GB)

( * ) Notice: Subject to any disclaimer, the term of this patent is extended or adjusted under 35 U.S.C. 154(b) by 1965 days.

(21) Appl. No.: 10/983,170

(22) Filed: Nov. 5, 2004

(65) Prior Publication Data

US 2005/0171895 A1 Aug. 4, 2005

Related U.S. Application Data

(63) Continuation of application No. 10/745,694, filed on Dec. 29, 2003, now abandoned.

(60) Provisional application No. 60/438,025, filed on Jan. 2, 2003.

(51) Int. Cl.
    *G06Q 40/00* (2012.01)
(52) U.S. Cl.
    USPC .......................................... 705/37; 705/36 R
(58) Field of Classification Search
    USPC ....................................................... 705/36, 35
    See application file for complete search history.

(56) References Cited

U.S. PATENT DOCUMENTS

| | | | |
|---|---|---|---|
| 6,236,980 B1 * | 5/2001 | Reese | 705/36 R |
| 6,493,682 B1 | 12/2002 | Horrigan et al. | |
| 2002/0042765 A1 | 4/2002 | Dawson | |
| 2002/0059131 A1 | 5/2002 | Goodwin et al. | |
| 2003/0074292 A1 | 4/2003 | Masuda | |
| 2003/0149648 A1 * | 8/2003 | Olsen et al. | 705/35 |
| 2004/0210502 A1 | 10/2004 | Madhavan et al. | |
| 2006/0059078 A1 | 3/2006 | Courbois et al. | |

OTHER PUBLICATIONS

Bond Price Data and Bond Market Liquidity. Sarig and Warga. Journal of Financial and Quantitative Analysis. pp. 367-378. Sep. 1989. vol. 24, No. 3.*
Opening and Closing the Market: Evidence from the London Stock Exchange. Ellul, Shin, and Tonks. The Journal of Financial and Quantitative Analysis. pp. 779-801. Dec. 2005. vol. 40, No. 4.*
Quantifying market order execution quality at the New York stock exchange. Bacidore, Ross, and Sofianos. Journal of Financial Markets. vol. 6, issue 3. pp. 281-307. May 2003.*

* cited by examiner

*Primary Examiner* — Hani M Kazimi
*Assistant Examiner* — John Preston
(74) *Attorney, Agent, or Firm* — Dickstein Shapiro LLP

(57) ABSTRACT

Benchmarks for the price of a financial instrument such as FX spot rate for a currency pair are calculated by an algorithm based on a previous benchmark and a market price. The market price is derived from a deal price and a quote price. The deal price is based on deals conducted since the last benchmark and the quote price is based on bids and offers entered since the last benchmark. For each of the deal and quote prices, a price, weight and scatter is calculated which is used to calculate a benchmark price, weight and scatter and a benchmark error.

50 Claims, 6 Drawing Sheets

Deal: 0.9800
——————————————————————— Benchmark 0.9800

METHOD AND APPARATUS FOR DERIVING BENCHMARKS FOR TRADING INSTRUMENTS

CROSS-REFERENCE TO RELATED APPLICATION

This application is a continuation of U.S. application Ser. No. 10/745,694, filed Dec. 29, 2003, now abandoned which claims benefit of U.S. Provisional Application No. 60/438,025, filed Jan. 2, 2003, each of which are hereby incorporated by reference in their entirety.

FIELD OF THE INVENTION

This invention relates to methods, apparatus and systems for deriving benchmarks for use in trading instruments, particularly but not exclusively, financial instruments such as foreign exchange (FX), including FX spot, FX forwards and other foreign exchange products.

BACKGROUND TO THE INVENTION

Benchmarks are used in the trading of instruments such as FX spot to provide a reference point which indicates the actual state of the market and which is neither biased to the buy side or sell side of the market. As markets can move very rapidly it is important to recalculate the benchmarks frequently and to distribute them to participating traders and other interested parties so that the benchmarks remain a reliable indicator.

Benchmarks may be derived in a number of ways. However, all are based on the market history, and access to good information as to the current state of the market, and trades conducted in the market is essential. Typically, a financial institution will trade a variety of currency pairs and benchmarks need to be established in each of those pairs.

SUMMARY OF THE INVENTION

The present invention aims to provide an improved algorithm for calculation of benchmarks. The algorithm calculates benchmarks on the basis of the prices of deals conducted since a previous benchmark was established, quotes at present in the market and the previous benchmark price. The invention further aims to provide a computerized system which can calculate those benchmarks according to the algorithm and then deliver them to traders.

More specifically there is provided a method of establishing a benchmark price for trades in a instrument at a given time, comprising: acquiring prices at which deals in the instrument have been conducted since a previous benchmark price was established; acquiring the prices of quotes at present in the market; and calculating a benchmark price from the previous benchmark price and a measure of deal prices and quote prices occurring since the previous benchmark price.

Preferably a market price is calculated from the measure of deal prices and quote prices; and the benchmark is calculated from the market price and the previous benchmark price. Preferably the deal prices and the quote prices are acquired from a trading system.

Preferably, the benchmark is established periodically every t seconds. This enables the benchmark price to remain an accurate reflection of the true state of the market.

Preferably, the calculation of market prices includes the weighting of deal prices according to size and/or age. Weighting may be performed in terms of multiples of a minimum deal size, preferably according to the formula $W(d_i)=V_i*2^{-ct}$ where $V_i$ is the volume of the deal, t is the elapsed time since the previous benchmark, and c is a constant determining the speed at which deals are marked down over time.

Preferably, the calculation of market prices includes the summing of the weights of all deal prices occurring since the previous benchmark.

The market price may be calculated from a deal price obtained from the arithmetic average of individual deal prices for deals conducted since the previous benchmark was established, weighted by their deal weight. Deal price calculation may further include calculation of a scatter for deals conducted since the previous benchmark price was established. This deal price scatter may be derived from the standard deviation of deals measured with respect to deal price and weight.

The calculation of market prices may also comprise weighting quote prices according to size and age. Weighting may be in terms of a minimum quote size and may be according to their distance from the best quote in the market. Weighting may be performed according to the formula: $W(Q_i)=V_i*2^{-P(Q_i)-B}$ where $V_i$ is the volume of a quote, $P(Q_i)$ is the quote price and B is the best bid or offer depending on whether $Q_i$ is a bid or an offer.

All quote prices occurring since the previous benchmark may also be summed and adjusted by a constant representing demand as part of the process of obtaining the market price.

Preferably, a quote scatter price is also calculated for all quotes entered into the market since the previous benchmark price was established. This scatter may be derived fro the standard derivation of quote prices measured with respect to quote price and weight.

Preferably, the market price is derived from an average of the quote and deal prices each sealed by its own weight. A market price weight is calculated from the sum of the deal and quote price weights.

Preferably a market price scatter is calculated, for example from the standard derivation of weighted market prices.

Preferably, a phantom price is also calculated. If no prices have been entered since the last benchmark, this phantom price is equal to the previous benchmark. If prices have been entered, this price is zero.

The phantom price may have a weight which is equal to a very small constant, for example $0.5*10^{-6}$. The phantom price may also have a scatter which is equal to a small constant, such as 1% of the base figure of the instrument being traded.

Preferably, the benchmark price is derived from the market price, a market price weight, the previous benchmark price, and a previous benchmark price weight. The latter weight may be calculated from the sum of the market price weight and the last benchmark price weight modified by a time markdown.

Preferably, a benchmark price error is also calculated. This error may be a standard error derived from the benchmark scatter and the benchmark price weight.

A further aspect of the invention provides a method of establishing a benchmark price for trades in a instrument at a given time, comprising: acquiring from at least one trading system deal price information relating to prices at which deals in the instrument have been conducted since a previous benchmark price was established; calculating from the deal price information, a deal price weight, a deal price and a deal scatter; acquiring from the at least one trading system price quote information relating to the prices of quotes at present in the trading system; calculating from the quote price information a quote price weight, a quote price and a quote price scatter; calculating a market price weight, a market price and a market price scatter from the deal price weight, the deal price and the deal price scatter, the quote price weight, the quote price and the quote price scatter; and calculating a benchmark price from the previous benchmark price and the market price.

The invention further provides a method of establishing a benchmark price for trades in an instrument at a given time, comprising the step of: periodically calculating the benchmark price from a previous benchmark price and a measure of deal prices and quote prices occurring since the previous benchmark price.

The invention also provides a method of establishing a benchmark price for trades in an instrument at a given time, comprising the step of: periodically calculating the benchmark price from a previous benchmark price and a measure of deal prices occurring since the previous benchmark price, wherein the deal prices are weighted in accordance with their age.

The invention also provides a method of establishing a benchmark price for trades in an instrument at a given time, comprising the step of: periodically calculating the benchmark price from a previous benchmark price and a measure of deal prices occurring since the previous benchmark price, wherein the deal prices are weighted in accordance with their volume.

The invention further provides A method of establishing a benchmark price for trades in an instrument at a given time, comprising the step of: periodically calculating the benchmark price from a previous benchmark price and a measure of deal prices occurring since the previous benchmark price, wherein the deal prices are weighted in accordance with their age and volume.

BRIEF DESCRIPTION OF THE DRAWINGS

Embodiments of the invention will now be described, by way of example only, and with reference to the accompanying drawings, in which.

DESCRIPTION OF BEST MODE

Figure 1:
FIG. 1 illustrates how deal prices may be scattered or condensed during any time interval.

The algorithm used to calculate benchmark prices will first be described. A computerized system which can calculate those benchmarks according to the algorithm and then deliver them to traders will then be described.

The following description considers how benchmark prices are derived from the various trading data that is available, for example from an anonymous trading system, or another trading system or systems. The Benchmark price is derived from the market price and the previous Benchmark price. The market price is itself derived from the deal price and the quote price. The deal price is calculated from actual deals that have been done on the system and the quote price is calculated from quotes (bids and offers) that have been entered into the system by traders.

In the foreign exchange market, for example, the price of a currency pair moves up and down. The Benchmark Price attempts to describe the price best by utilizing market information acquired from one or more sources, such as an anonymous trading system. The Benchmark Price is calculated at a given frequency, for example, every t seconds. At each tick, a Benchmark is published along with a margin of error called the Standard Error.

Using the market information from the trading system is like sampling the price population at the tick time. This sample includes deal and quote transactions. These transactions act as traders' votes on where the market is.

The currency pair price is a population (P) at any given moment. Suppose its mean is MN(P) (the "true price") and its Standard Deviation is SD(P). The Benchmark Price approximates MN(P) by sampling this price population. In the following description, P is used to represent the "price population" as well as the price; that is, the Mean price of the population, just as MN(P).

A general overview will first be given, showing how Benchmark prices are calculated. The derivation of each element will then be discussed in more detail.

Prices

At time n, Benchmark Price $P_n$, is derived from Market Price at the time, and $P_{n-1}$, the Benchmark Price at the last tick n−1. Market price consists of Deal Price calculated from deals that occurred in the past time interval, and Quote Price calculated from quotes at the moment.

These four elements may be expressed as follows:
At time n: DealPrice=function (deal price and volume in the past time interval of n−1 to n);
QuotePrice=function (quotes price and volume at n);
MarketPrice=function (QuotePrice, DealPrice); and
BenchmarkPrice=function (MarketPrice, BenchmarkPrice at n−1).

Weight and Scatter

For each of these prices, an associated weight W and a value of Scatter, or an approximated Standard Deviation, σ are also calculated. That is, a triplet of (P, W, σ) is associated with each data point.

In the following description, the manner in which each of these three P, W, σ will be discussed for DealPrice, QuotePrice, MarketPrice and BenchmarkPrice.

The weight serves as the sample size in statistical terms. In this example, in common with most anonymous trading systems, traders can trade at a minimum trading size. The parameter, which is defined by the trading system, is the minimum amount of a bid or offer order. In an interbank trading system trading spot FX this is typically in the order of $US 1 million ($1 M). Every minimum trading size in the trades should be considered as ONE "vote" for a price. All "votes" should be taken into consideration. The larger the volume of a transaction, the more "votes" (more confidence about the price) carried by the trade.

In other words, a trading amount is converted to units of "minimum trading size" when it is being weighted. Where the minimum is $1 M, a bid of $10 M would count as 10 votes when being weighed.

The weight of the price W and Scatter a are used internally. The weight W is used when the price is combined with other prices to form a new one.

Standard Error

From the weight W and Scatter σ, a margin of error or a Standard Error is calculated. It provides a measure of confidence in the Benchmark Price derived from the market data.

Consider a Benchmark B as a sample of the price population P using market information (prices/volumes of deals and quotes). Let MN(B), WT(B), SD(B), and SE(B) be the mean (Benchmark Price), Weight (sample size), Standard Deviation, and Standard Error, respectively.

If Standard Error SE(B)=SE (pips), then we can say that the sample mean MN(B) has a 95% chance of lying within two SE of the mean of the population of MN(P) (the "true price"), or, the Benchmark Price has a 95% chance satisfying:

$$MN(P)-2*SE < \text{Benchmark Price} < MN(P)+2*SE$$

That is, the Benchmark Price is almost certain (a 95% chance) in the 2*SE-neighborhood of the "true price". Apparently, the smaller the SE, the more precise is the Benchmark Price.

For example, if MN(S)=0.9779 and SE(S)=0.00002, and P is the "true price" of the currency pair, then the Benchmark Price of 0.9779 has a 95% chance lying within (P−0.00004, P+0.00004) or, conversely, P has a 95% chance of lying within the Benchmark Price interval of (0.97786, 0.97794).

The Standard Error and its formula is discussed in greater detail later on.

Thus, it can be seen that the Deal Price and the Quote Price are the fundamental building blocks of the Benchmark Price. The manner in which these are obtained will now be discussed in detail.

Deal Price

The Benchmark is calculated at a certain frequency. At each tick t when the Benchmark is to be calculated, there may be deals which have occurred since calculation of the last Benchmark at time (t−1). Deal Price is derived from the deals in the past time interval. It is an average price of all deal prices weighted by the volume and age of deals.

Deal Price Weight ($W_d$)

Deals of larger amounts count more than smaller amounts. Recent deals count more than aged deals.

"Minimum Trading Size" Adjustment

As mentioned above, each deal is weighted by the "minimum trading size". That is, the Volume $V_i$ of a deal $d_i$ is the deal's amount in the units of minimum trading size. In the $10 M example above, the volume would be 10.

Time Markdown

In the past time interval since the last benchmark price, many deals may have occurred. Deals that happened in the same second (or some other defined time interval) are considered the same "age". Going backwards, the deals that occurred in the second away from the tick-time are discounted by an exponential function $2^{-ct}$, where t is the number of seconds away from the tick-time and c is a constant.

For example, if c=0.5 and t=1 (one second earlier than tick-time), $2^{-ct}=2^{-0.5}=0.707$. That is, the deal that happened one second ago is worth 70.7% of the deal that happened now (at tick-second). If c=1 and t=1, $2^{-ct}=2^{-1}=0.5$. That is, the deal that happened one second ago is worth one-half of the deal that happened now (at tick-second).

Weight of a Deal

To apply the minimum trading size adjustment and time markdown to deals that occurred in the past time interval, the weight of a deal $d_i$ must be calculated as follows:

$$W(d_i)=V_i*2^{-ct}, \quad \text{Equation 1}$$

where $V_i$ is the Volume (deal amount in minimum trading size units) of deal $d_i$;

t is time elapsed in seconds since $d_i$ occurred (to the tick-time);

c is a constant coefficient of adjustment defining the speed of deal price markdown.

Deal Price Weight

The Deal Price Weight consists of all weights of all deals that occurred in the past time interval. It is a summation of all deal weights:

$$W_d = \Sigma_i W(d) = \Sigma_i V_i * 2^{-ct} \quad \text{Equation 2}$$

where $\Sigma_i$ runs over all deals occurring in the past time interval;

$V_i$ is the Volume (deal amount in "minimum trading size" units) of deal $d_i$;

t is time elapsed in second since $d_i$ occurred (to the tick-time);

c is a constant coefficient of adjustment defining the speed of deal price markdown.

Table 1 lists the time-markdown-values of $2^{-ct}$ according to time elapsed (t) for C=0.5 and C=1.0:

TABLE 1

|  | c = 0.5 | | c = 1.0 | |
| --- | --- | --- | --- | --- |
| t | −ct | $2_{-ct}$ | −ct | $2_{-ct}$ |
| 0 | 0.0 | 1.0000 | 0.0 | 1.0000 |
| 1 | −0.5 | 0.7071 | −1.0 | 0.5000 |
| 2 | −1.0 | 0.5000 | −2.0 | 0.2500 |
| 3 | −1.5 | 0.3536 | −3.0 | 0.1250 |
| 4 | −2.0 | 0.2500 | −4.0 | 0.0625 |
| 5 | −2.5 | 0.1768 | −5.0 | 0.0312 |
| 6 | −3.0 | 0.1250 | −6.0 | 0.0156 |
| 7 | −3.5 | 0.0884 | −7.0 | 0.0078 |
| 8 | −4.0 | 0.0625 | −8.0 | 0.0039 |
| 9 | −4.5 | 0.0442 | −9.0 | 0.0020 |
| 10 | −5.0 | 0.0312 | −10.0 | 0.0010 |

It will be seen that the larger the value of C, the faster the markdown.

In the special case of a Benchmark frequency of one second, the Benchmark is calculated every second and only deals that occurred in the past second are used in the calculation. Then Equation 2 becomes $$W_d = \Sigma_i W(d_i) = \Sigma_i V_i * 2^{-c \times 0} = \Sigma_i V_i * 1 = \Sigma_i V_i.$$

This suggests that the parameter c that controls the markdown speed looses its effect, and the time markdown disappears, as will been seen below, the time markdown is used in the form of a historical price markdown, where c plays the same role.

Deal Price ($P_d$)

If $P(d_i)$ is the price of a deal $d_i$, then the combined deal price of all deals that occurred in the past time interval is simply the arithmetic average of all deals weighted by their Weights of Deal:

$$P_d = \frac{\sum_i P(d_i) * W(d_i)}{\sum_i W(d_i)} \quad \text{Equation 3}$$

where $\Sigma_i$ runs through all deals $d_i$ occurred in the past time interval.

In the case of a one-second Benchmark, each deal's weight is its Volume. Table 2 lists the Deal Price of five deals that occurred in the past time interval. The Deal Price is a real number, not restricted by whole pips 0.9779882353.

TABLE 2

| Deals | Price (P) | Weight (W) | P * W |
|---|---|---|---|
| 1 | 0.9781 | 2 | 1.956200 |
| 2 | 0.9780 | 2 | 1.956000 |
| 3 | 0.9781 | 1 | 0.978100 |
| 4 | 0.9780 | 7 | 6.846000 |
| 5 | 0.9779 | 5 | 4.889500 |
| | Total: | 17 | 16.625800 |
| | | Deal Price (Pd): | 0.9779882353 |

Deal Price Scatter ($\sigma_d$)

In the past time interval, deal prices may scatter widely, reflecting a market in which traders disagree with each other on where the market is and the votes are widespread. Alternatively, deal prices may concentrate at one spot, where everyone agrees where the market is. This is illustrated in FIG. 1.

The Deal Price Scatter can be measured by the Standard Deviation of deals:

$$\sigma_d = \sqrt{\frac{\sum_i W(d_i)(P(d_i) - P_d)^2}{\sum_i W(d_i)}} \quad \text{Equation 4}$$

where $P_d$ is the Deal Price calculated from equation 3 above;

$W(d_i)$ is the individual Deal Weight derived from equation 1 above;

$\Sigma_i$ runs through all deals $d_i$ that occurred in the past time interval.

The Standard Deviation (SD) of a population is a measurement of the spread of the population distribution. It is like an average distance of the population to the mean of the population. Large SD is a good indication of volatility showing that prices are widely dispersed from the average.

Using the example above, table 3 shows the Scatter:
Scatter=sqrt (0.0000000776/17)=0.0000675831.

TABLE 3

| Deals | Price (P) | Weight (W) | P * W | W * (P − Pd)2 |
|---|---|---|---|---|
| 1 | 0.9781 | 2 | 1.956200 | 0.0000000250 |
| 2 | 0.9780 | 2 | 1.956000 | 0.0000000003 |
| 3 | 0.9781 | 1 | 0.978100 | 0.0000000125 |
| 4 | 0.9780 | 7 | 6.846000 | 0.0000000010 |
| 5 | 0.9779 | 5 | 4.889500 | 0.0000000389 |
| | Total: | 17 | 16.625800 | 0.0000000776 |
| | | Deal Price (Pd): | 0.9779882353 | |
| | | | Scatter ($\sigma_d$): | 0.0000675831 |

It will be appreciated from the above discussion that Equations 1, 2, and 3 define, respectively, the three elements ($P_d$, $W_d$, $\sigma_d$) of Deal Price.

Quote Price

Quote Price is derived from all live quotes in the anonymous trading system or other data source at the tick-time.

When there are more offers in the market, more people are trying to sell. The liquidity on the offer/selling side results in sells at the prices of the "front line" of bids, the Best Bid.

Conversely, if there are more bids, more people are buying. The liquidity on the bid/buying side results in buys at the prices of the "front line" of offers, the Best Offer.

Quote Price maps market liquidity to "Buying Power" at the Best Bid and Best Offer prices at the time.

Quote Price Weight ($W_q$)

As with Deal Price, a quote with a small amount is worth less than a quote with a large amount. A far-away-from-the-market quote is not worth as much as a close-to-the-market quote. To describe the weight of a quote, we need to take into consideration both the amount and the positioning of the quote with respect to the best Bid/Offer.

"Minimum Trading Size" Adjustment

A quote can be at the minimum trading size. Therefore, each quote is weighted by the minimum trading size. That is, the Volume of a quote $Q_i$ is the quote's amount in the units of minimum trading size.

Distance Markdown

The front line of a market is drawn by the Best Bid ($P_b$) and Best Offer ($P_o$). The distance of a quote price from the Best, measured in the number of pips, shows "how good the quote price is". The term "pip" is well understood in the financial trading art and refers to the least significant digit of the price that is quoted.

At any moment, the Best Bid is the highest bid, and the Best Offer is the lowest offer of the Market from which data is obtained, regardless of credit situation. This is not always the best price that is displayed to traders, as many trading systems do not display to traders prices which they cannot deal, for example submitted by a counterparty with whom they have no or insufficient credit.

If $P(Q_i)$ is the price of a quote $Q_i$, and B is the price of the Best of the same side, then the distance of this quote to the Best is $|P(Q_i)-B|$. The position markdown is defined by the exponential function:

$$2^{-|P(Qi)-B|}$$

When the distance is 0, 1, 2, 3, 4, . . . , (pips), $2^{-|P(Qi)-B|}=1$, ½, ¼, ⅛, 1/16, . . . .

Weight of a Quote

To apply minimum trading size and the distance markdown, the weight of a quote $Q_i$ is:

$$W(Q_i) = V_i * 2^{-|P(Qi)-B|}, \quad \text{Equation 5}$$

where $V_i$ is the Volume (quote amount in "minimum trading size" unit) of quote $Q_i$;

$P(Q_i)$ is the price of quote $Q_i$;

B=$P_b$ (Best Bid) if $Q_i$ is a bid, B=$P_o$ (Best Offer) if $Q_i$ is an offer, and $|P(Q_i)-B|$ is in the number of pips, the distance to the Best Price.

It can be seen that a quote is weighted by its Volume and marked down by its distance to the Best Price.

Table 4 shows an example of weight of quotes. All quotes have the same Volume, but the distances to the Best vary.

TABLE 4

| Offers | Price | Volume | Distance | Weight |
|---|---|---|---|---|
| 1 | 0.9780 | 10 | 0 | 10.0000 |
| 2 | 0.9781 | 10 | 1 | 5.0000 |
| 3 | 0.9782 | 10 | 2 | 2.5000 |

TABLE 4-continued

| Offers | Price | Volume | Distance | Weight |
|---|---|---|---|---|
| 4 | 0.9783 | 10 | 3 | 1.2500 |
| 5 | 0.9784 | 10 | 4 | 0.6250 |

The weight of the quotes goes down ½ each time the quote moves one more pip away from the market.

In the example of Table 5 below, the quotes' distances to the Best vary, and their Volumes get larger when moving away from the market.

TABLE 5

| Bids | Price | Volume | Distance | Weight |
|---|---|---|---|---|
| 1 | 0.9779 | 10 | 0 | 10.0000 |
| 2 | 0.9778 | 20 | 1 | 10.0000 |
| 3 | 0.9777 | 40 | 2 | 10.0000 |
| 4 | 0.9776 | 80 | 3 | 10.0000 |
| 5 | 0.9775 | 160 | 4 | 10.0000 |

As can be seen from Table 5, a volume of twenty at one-pip away is worth (is equivalent to) a volume of 10 at the zero-pip; a volume of 160 at 4-pips away is worth (is equivalent to) the volume of 10 at zero-pip.

Weight of All Quotes

The weight of a group of quotes is merely the summation of the weight of each individual quote.

The Weight of Bids is $$V_b = \Sigma_i^b W(Q_i) = \Sigma_i^b V_i / 2^{(Pb-Pi)}, \quad \text{Equation 6}$$

and the Weight of Offers is $$V_o = \Sigma_i^o W(Q_i) = \Sigma_i^o V_o / 2^{(Pi-Po)}, \quad \text{Equation 7}$$

where $W(Q_i)$ is the weight of quote $Q_i$; $\Sigma_i^b$ sums up all bids, $\Sigma_i^o$ sums up all offers;

$V_i$ is the Volume of quote $Q_i$;

$P_b$ is the Best Bid, $P_o$ is the Best Offer, and $(P_b-P_i)$, $(P_i-P_o)$ are in pips.

Note the $(P_b-P_i) \geq 0$ since $P_b$ is the highest bid, and $(P_i-P_o) \geq 0$ since $P_o$ is the lowest offer.

Thus, the Weight of Bids $V_b$ is the volume-equivalent of the bids at the Best Bid price, and the Weight of Offers $V_o$ is the volume-equivalent of the offers at Best Offer price.

The Quote Price Weight consists of a scaled summation of Bid Weight and Offer Weight. The Quote Price Weight is:

$$W_q = \lambda \Sigma_i W(Q_i) = \lambda (V_b + V_o) \quad \text{Equation 8}$$

where $\lambda$ is a constant coefficient which controls the share of quote's weight in Market Price, as will be discussed;

$V_b$ is the Weight of Bids; and $V_o$ is the Weight of Offers.

Where the market is one-sided, that is there are only bids or offers in the market, $W_q = 0$. That is, one-sided quotes do not carry any weight. In the next section to be described, the quotes are converted to "deals" in the calculation of a quote's price. An "empty" side causes the "deal price" to be zero. Therefore, the weight of non-deal is zero.

Table 6 shows an example of Weight of Offers. Although there are five offers in the market with a total volume of 50, the offers are worth 19.375 at the Best Offer price.

TABLE 6

| Offers | Price | Volume | Distance | Weight |
|---|---|---|---|---|
| 1 | 0.9780 | 10 | 0 | 10.0000 |
| 2 | 0.9781 | 10 | 1 | 5.0000 |
| 3 | 0.9782 | 10 | 2 | 2.5000 |
| 4 | 0.9783 | 10 | 3 | 1.2500 |
| 5 | 0.9784 | 10 | 4 | 0.6250 |
| | | | Vo: | 19.3750 |

Table 7 shows an example of Weight of Bids. Although there are five bids in the market with a total volume of 310, the bids are worth 50 at the Best Bid price.

TABLE 7

| Bids | Price | Volume | Distance | Weight |
|---|---|---|---|---|
| 1 | 0.9779 | 10 | 0 | 10.0000 |
| 2 | 0.9778 | 20 | 1 | 10.0000 |
| 3 | 0.9777 | 40 | 2 | 10.0000 |
| 4 | 0.9776 | 80 | 3 | 10.0000 |
| 5 | 0.9775 | 160 | 4 | 10.0000 |
| | | | Vb: | 50.0000 |

Table 8 shows an example of the Quote Price Weight. $(V_b+V_o)=69.375$ volume of quote, but the Quote Price Weight is reduced to 6.940 due to the $\lambda$ scale-down.

TABLE 8

| Offers | Price | Volume | Distance | Weight | Bids | Price | Volume | Distance | Weight |
|---|---|---|---|---|---|---|---|---|---|
| 1 | 0.9780 | 10 | 0 | 10.0000 | 1 | 0.9779 | 10 | 0 | 10.0000 |
| 2 | 0.9781 | 10 | 1 | 5.0000 | 2 | 0.9778 | 20 | 1 | 10.0000 |
| 3 | 0.9782 | 10 | 2 | 2.5000 | 3 | 0.9777 | 40 | 2 | 10.0000 |
| 4 | 0.9783 | 10 | 3 | 1.2500 | 4 | 0.9776 | 80 | 3 | 10.0000 |
| 5 | 0.9784 | 10 | 4 | 0.6250 | 5 | 0.9775 | 160 | 4 | 10.0000 |
| | | | Vo: | 19.3750 | | | | Vb: | 50.0000 |

From Table 8, if $\lambda=0.1$, then:

$$W_q = \lambda(V_b+V_o) = 0.1*(19.375+50.0) = 6.9375.$$

Quote Price ($P_q$)

The weight of bids $V_b$ and offers $V_o$ defines "buying and selling demand" at the time. The Buys/Sells resulting from the demand is a function of the prices ($P_b$, $P_o$) and the liquidity ($V_b$, $V_o$) at the time. That is, Buys=Function$_b$($V_b$, $V_o$, $P_b$, $P_o$) Similarly, Sells=Function$_b$($V_b$, $V_o$, $P_b$, $P_o$).

The buy volume is proportional to $V_b$ (buying demand) and the sell volume is directly proportional to $V_o$ (selling demand). Therefore, Function$_b$ and Function$_s$ are linear:

deal-volume=$\lambda$*demand, or more specifically,

Buy-volume=λ*(buying demand)=λ*$V_b$,

Sell-volume=λ*(selling demand)=λ*$V_o$;

where λ is a constant coefficient (a percentage) that converts quote volume into deal volume.

Deals almost always occur only at or near the "front line" of the market. That is, buys resulting from the buying demand are at the Best Offer price of $P_o$, and sells resulting from the selling demand are at the Best Bid price of $P_b$. There will be some deviation from this, particularly where a party does not have credit with the owner or owners of the best offer or bid and so trades below the front line. Even so the trade will almost always be very close to that front line.

The bids, and the resulting "buying power", are now converted into deals of buy at the price of $P_o$ and volume of λ*$V_b$. The offers, and the resulting "selling power", are now converted into deals of sell at price Pb and volume of λ*$V_o$.

$$\sigma_q = \sqrt{\frac{\lambda V_o (P_b - P_q)^2 + \lambda V_b (P_o - P_q)^2}{\lambda V_o + \lambda V_b}} = \sqrt{\frac{V_o (P_b - P_q)^2 + V_b (P_o - P_q)^2}{V_o + V_b}}$$

Equation 10 where $P_q$ is the Quote Price derived from Equation 8 above;
$P_b$ and $P_o$ are EBS Best Bid and Best Offer, respectively;
$V_b$ and $V_o$ are Weight of Bids and Weight of Offers, respectively.

It can now be seen that the three elements of the triplet ($P_q$, $W_q$, $\sigma_q$) of Quote Price are defined by Equations 9, 8 and 10 respectively.

Where the market is one sided, $\sigma_q$=0.

Table 9 shows how the quote scatter is obtained, using the results of Table 8 and the value of $P_q$ obtained above.

TABLE 9

| Pb | Po | Pq | Vb | Vo | Vo(Pb − Pq)2 | Vb(Po − Pq)2 | Vb + Vo | Scatter ($\sigma_q$) |
|---|---|---|---|---|---|---|---|---|
| 0.9779 | 0.9780 | 0.9779720721 | 50.000 | 19.375 | 0.0000001006 | 0.0000000390 | 69.375 | 0.0000448645 |

As quotes are mapped into "deals" of buys of $\lambda V_b$ volume at price $P_o$ and sells of $\lambda V_o$ volume at price $P_b$, the deal price formula of Equation 3 can be used to derive the Quote Price $P_q$:

$$P_q = \frac{P_b * \lambda V_o + P_o * \lambda V_b}{\lambda V_o + \lambda V_b} = \frac{P_b * V_o + P_o * V_b}{V_o + V_b}$$

Equation 9 where $P_b$ and $P_o$ are Best Bid and Best Offer, respectively;
$V_b$ and $V_o$ are Weight of Bids and Weight of Offers, respectively.

$P_q$ is the average price of buys at $P_o$ with volume $\lambda V_b$ and sells at $P_b$ with volume $\lambda V_o$. Note that in Equation 8, the λs are cancelled out. That is, λ does not influence the outcome of Quote Price. Quote Price is solely determined by the Best Prices and the liquidity of the market.

Mapping quotes to "deals" requires both sides of the market to work. In the cases of no quote or a one-sided-market, $P^q$=0. As stated above, in these cases, the quote's weight is also zero.

By way of example, and continuing from the results of Table 8 above, where $P_b$=0.9779, $P_o$=0.9780, $V_b$=50.0, and $V_o$=19.375, we have $$P_q = \frac{P_b * V_o + P_o * V_b}{V_o + V_b} = \frac{0.9779 * 19.375 + 0.9780 * 50.0}{19.375 + 50.0} = 0.9779720720719$$

As the buying demand is larger ($V_b$=50.0>$V_o$=19.375), the Quote Price $P_q$ is pushed up, at almost the Best Offer price.

Quote Price Scatter ($\sigma_q$)

Since the quotes are mapped into deals, we can apply the formula of Deal Scatter on the quotes'. According to Equation 4, the quote "scatterness" the Standard Deviation of quotes is:

The Deal Price triplet ($P_d$, $W_d$, $\sigma_d$) and the Quote Price triplet ($P_q$, $W_q$ and $\sigma_q$) have now been defined. These values need to be consolidated in the Market Price to give a good indication of where the market actually is.

Market Price

The Market Price Triplet ($P_m$, $W_m$, $\sigma_m$) is constructed by simply combining Deal Price information ($P_d$, $W_d$, $\sigma_d$) and Quote Price information ($P_q$, $W_q$, $\sigma_q$). Without using historical information, Market Price is calculated from current live quotes and the latest deals that occurred in the past time interval.

Market Price ($P_m$)

The Market Price PM is derived by averaging the Quote Price and Deal Price, and each is scaled by its Weight:

$$P_m = \frac{P_q * W_q + P_d * W_d}{W_q + W_d}$$

Equation 11 where $P_q$ is the Quote Price from Equation 8 above;
$P_d$ is the Deal Price from Equation 3;
$W_q$ is the Quote Weight from Equation 7; and
$W_d$ is the Deal Weight from Equation 2.

Equation 8 stated that $W_q = \lambda(V_b + V_o)$, and the constant coefficient λ is used to control the share of quotes. Equation 11 shows that since Quote Price is weighted by its weight of $W_q$, and $W_q = \lambda(V_b + V_o)$, λ plays an important role of scaling quote weight in respect to Deal Weight. Thus, if λ=0.1, it means a 10 volume of quotes is worth one volume of deals.

Following on from the Example of Table 10, Table 11 shows how Equation 10 can be used to obtain the market price.

TABLE 11

| Pq | 0.9779720721 | 0.9779882353 | Pd |
|---|---|---|---|
| Wq | 6.9375 | 17.0000 | Wd |
| $\sigma_q$ | 0.0000448645 | 0.0000675831 | $\sigma_d$ |
| | Market Price: | 0.9779835509 | |

Market Price Weight ($W_m$)

The Market Price Weight is summation of Deal Price Weight and Quote Price Weight:

$$W_m = W_d + W_q \quad \text{Equation 12}$$

$W_d$ and $W_q$ calculations are stated by Equations 2 and 7 respectively.

Thus, continuing with the example, of Table 10, Table 12 shows the Market Price weigh $W_m$.

TABLE 12

| Wq | Wd | Wm |
|---|---|---|
| 6.9375 | 17.0000 | 23.9375 |

Market Price Scatter ($\sigma_m$)

Applying the definition of Standard Deviation, we get the Market Price Scatter as follow:

$$\sigma_m = \sqrt{\frac{\lambda V_o (P_b - P_m)^2 + \lambda V_b (P_o - P_m)^2 + \sum_i W(d_i)(P(d_i) - P_m)^2}{\lambda V_o + \lambda V_b + \sum_i W(d_i)}} \quad \text{Equation 13}$$

If $P_q=0$ (no quotes, one-sided-market), then quotes are no longer part of the consideration and Equation 13 becomes:

$$\sigma_m = \sqrt{\frac{\sum_i W(d_i)(P(d_i) - P_m)^2}{\sum_i W(d_i)}} \quad \text{Equation 13(b)}$$

Table 13 continues the example of table 10 and shows calculations of Market Price Scatter:

TABLE 13

| Pm | Deals | Price (P) | Weight (W) | λ | W * (P − Pm)2 |
|---|---|---|---|---|---|
| 0.9779836 | 1 | 0.9781 | 2 | | 0.0000000271 |
| | 2 | 0.9780 | 2 | | 0.0000000005 |
| | 3 | 0.9781 | 1 | | 0.0000000136 |
| | 4 | 0.9780 | 7 | | 0.0000000019 |
| | 5 | 0.9779 | 5 | | 0.0000000349 |
| | Bid->Buy | 0.9780 | 50.000 | 0.1 | 0.0000000014 |
| | Offer->Sell | 0.9779 | 19.375 | 0.1 | 0.0000000135 |
| | | Total: | 23.937500 | | 0.0000000929 |
| | | Scatter ($\sigma_m$): | 0.0000622966 | | |

At each tick t, the Market Price uses the current, latest information of the market. But in some off-peak hours or in some less-active currency pairs, complete current information may not be available. In those situations, Market Price ($P_m$, $W_m$, $\sigma_m$) must be combined with the previous Benchmark Price to derive the current price.

Having now obtained the Market Price, the Benchmark Price may now be derived.

Benchmark Price

Suppose the current tick is n, then current Benchmark Price triplet ($P_n$, $W_n$, $\sigma_n$) is derived from the current Market Price ($P_m$, $W_m$, $\sigma_m$), the last Benchmark Price ($P_{n-1}$, $W_{n-1}$, $\sigma_{n-1}$) calculated at the last tick, and a Phantom Price ($P_{ph}$, $W_{ph}$, $\sigma_{ph}$). As the last benchmark was calculated one time-interval ago, it is discounted accordingly.

The weight of the last Benchmark Price is marked down by a faction of $2^{-cT}$, where T is the time interval from the last Benchmark to the current tick.

Phantom Price is an imaginary price introduced to balance the no-price situation. The Phantom price has a very tiny weight that injects little influence on the calculations when prices are present, but which prevents the Benchmark weight from becoming zero where there are no prices in the Benchmark period. This, in turn, prevents the Standard Error from becoming infinite. It follows that in an active market, the phantom price is not essential to the calculation of the benchmark.

When prices exist in the market, Phantom Price is equal to Market Price. When there is no price in the market, Phantom Price equals the previous Benchmark Price. That is:

$$P_{ph}=P_m \text{ when } P_m \neq 0; P_{ph}=P_{n-1} \text{ when } P_m=0.$$

The weight of the Phantom Price $W_{ph}$ is a tiny constant, for example a half of one-millionth ($0.5*10^{-6}$). In the case of the minimum trading amount of one million (of base currency) for most currencies, the weight is ½ unit of the base currency. For example, while the minimum-trading amount for EUR/USD is one million (1,000,000) Euro, its Phantom Price's weight is 0.5 Euro. It will be seen from later discussion that this modest amount can ensure that the Standard Error does not become infinite.

The scatter of Phantom Price $\sigma_{ph}$ is a tiny constant as well. It is set at 1% of a Big Figure of a currency. The purpose of having $\sigma_{ph}$ is to prevent the scatter from becoming zero (therefore zero Standard Error) in quiet market.

Benchmark Price ($P_n$)

The Benchmark price is the average on the Market Price and (n−1) Benchmark Price, weighted by their Weights. The (n−1) Benchmark Price Weight has an extra time-markdown): Thus $$P_n = \frac{P_m * W_m + P_{n-1} * W_{n-1} * 2^{-cT} + P_{ph} * W_{ph}}{W_m + W_{n-1} * 2^{-cT} + W_{ph}} \quad \text{Equation 14}$$

where $P_m$ is the Market Price from Equation 10 above;

$W_m$ is the Market Price Weight from Equation 11;

$P_{n-1}$ is the previous Benchmark Price;

$P_{ph}$ is Phantom Price. $P_{ph}=P_m$ if $P_m \neq 0$; $P_{ph}=P_{n-1}$ if $P_m=0$;

$W_{ph}$ is the weight of Phantom Price, a small constant, set at $0.5*10^{-6}$;

$W_{n-1}$ is the previous Benchmark Price Weight;

T is the tick time interval in seconds; and c is a constant coefficient of adjustment defining the speed of deal/Benchmark price markdown.

The coefficient c is the same one used in the deal price elapsed-time markdown.

In the case of a still-market ($P_m=0$, $W_m=0$), $P_n=P_{n-1}$. That is, Benchmark Price does not change. Referring back to the example as discussed in Table 11, suppose c=1.0 and T=1, and suppose $P_{n-1}=0.9778096128$, $W_{n-1}=19.0458$, the Benchmark Price $P_n$, by using Equation 13 is shown in the Table below.

TABLE 14

| Pm | Wm | Pn-1 | Wn-1 | Pph | Wph | Wm + Wn-1 * 2-ct + Wph | Pn |
|---|---|---|---|---|---|---|---|
| 0.9779835509 | 23.9375 | 0.9778095128 | 19.0458 | 0.9778095128 | 0.000001 | 33.4604009156 | 0.9779340193 |

Benchmark Price Weight ($W_n$)

The Benchmark Price Weight is a summation of Market Price Weight and the last Benchmark Price Weight after applying the time markdown of $2^{-cT}$:

$$W_n = W_m + W_{n-1}*2^{-cT} + W_{ph} \quad \text{Equation 15}$$

Where the Phantom Price Weight $W_{ph}$ is a small constant.

Again, the Phantom Price is introduced solely to prevent the weight of the Benchmark from going down to zero in a quiet market when there is neither any price nor deal. Since its weight is tiny, it does not effect the price in a regular or busy market.

In the case of a still-market ($P_m=0$, $W_m=0$), suppose $W_1$ is the last Benchmark Price before an interval with no new active prices, then the Benchmark Price Weights are:

$$W_1, W_2 = W_1 * 2^{-cT} + W_{ph},$$
$$W_3 = W_2 * 2^{-cT} + W_{ph} = W_1 * 2^{-2cT} + W_{ph} * 2^{-cT} + W_{ph}, \ldots,$$
$$W_n = W_{n-1} * 2^{-cT} + W_{ph} = W_1 * 2^{-(n-1)cT} +$$
$$W_{ph} * 2^{-(n-2)cT} + \ldots + W_{ph} * 2^{-cT} + W_{ph}$$
$$= W_1 * 2^{-(n-1)cT} + W_{ph}(1 - 2^{-(n-1)cT})/(1 - 2^{-cT})$$
$$= W_1 * 2^{-(n-1)cT} + W_{ph}/(1 - 2^{-cT}) -$$
$$W_{ph} * 2^{-(n-1)cT}/(1 - 2^{-cT})$$

When $n \to \infty$ (c=1 and Benchmark is calculated every second: T=1), then $W_n \to W_{ph}/(1-2^{-cT})=2*W_{ph}$. That is, in a quiet market, the weight converges to $2*W_{ph}$. If Phantom Price is $0.5*10^{-6}$ (0.0000005), then the weight converges to $10^{-6}$ (one-millionth).

Continuing with the example of Table 14, suppose c=1.0, T=1, Equation 14 provides a Benchmark Price Weight $W_n = W_m + W_{n-1}*2^{-cT} = 33.4603999156$.

Benchmark Price Scatter ($\sigma_n$)

Before calculating the Benchmark Price scatter $\sigma_n$, the combined values of the Market Price and Phantom Price must be obtained.

In general, with two samples of the same population, there are two sets of means, sample sizes (weights) and Standard Deviations (Scatters). The two samples can be combined and the combined samples' Standard Deviation SD can be derived from the SDs of the two separate samples. Thus:

$$(4.3.0) \; \sigma_{1+2} = \sqrt{\frac{(N_1-1)\sigma_1^2}{N_1+N_2-1} + \frac{(N_2-1)\sigma_2^2}{N_1+N_2-1} + \frac{N_1 N_2 (M_1-M_2)^2}{(N_1+N_2)(N_1+N_2-1)}} \quad \text{Equation 16}$$

Where $M_1$, $M_2$, $\sigma$, $\sigma_2$ and $N_1$, $N_2$ are the means, SDs and sample sizes of the two samples. The combined price, weight and scatter triplet of ($P_c$, $W_c$, $\sigma_c$) are then obtained from the Market Price ($P_m$, $W_m$, $\sigma_m$) and the Phantom Price ($P_{ph}$, $W_{ph}$, $\sigma_{ph}$).

As the Phantom Price equal the Market Price when a Market Price exists, and equals the previous Benchmark Price when no Market Price exists, $P_c = P_m$ if $P_m \neq 0$; $P_c = P_{n-1}$ if $P_m = 0$.

The combined weight $W_c = W_m + W_{ph}$.

Finally, by applying the combined standard deviation of Equation 16 on ($P_m$, $W_m$, $\sigma_m$), and ($P_{ph}$, $W_{ph}$, $\sigma_{ph}$)

$$\sigma_c = \sqrt{\frac{(W_m-1)\sigma_m^2}{W_m+W_{ph}-1} + \frac{(W_{ph}-1)\sigma_{ph}^2}{W_m+W_{ph}-1} + \frac{W_m W_{ph}(P_m - P_{ph})^2}{(W_m+W_{ph})(W_m+W_{ph}-1)}}$$

From this formula, it can be concluded that when $P_m \neq 0$, $\sigma_c \approx \sigma_m$. That is, when prices exist, $\sigma_c$ is just the Market Price's scatter $\sigma_m$. When $P_m=0$, $\sigma_c \approx \sqrt{\sigma_m^2 + \sigma_{ph}^2}$. That is, when there is no prices, $\sigma_c$ is bounded by at least one $\sigma_{ph}$, since $\sqrt{\sigma_m^2 + \sigma_{ph}^2} \geq \sigma_{ph}$. This effectively prevents ac from going down to zero.

With ($P_c$, $W_c$, $\sigma_c$) having been derived, the Benchmark Price scatter can be calculated.

Applying Equation 16 on ($P_c$, $W_c$, $\sigma_c$) and ($P_{n-1}$, $W_{n-1}*2^{-cT}$, $\sigma_{n-1}$) gives:

$$\sigma_n = \sqrt{\frac{(W_c-1)\sigma_c^2}{W_c+W_{n-1}*2^{-cT}-1} + \frac{(W_{n-1}*2^{-cT}-1)\sigma_{n-1}^2}{W_c+W_{n-1}*2^{-cT}-1} + \frac{W_c W_{n-1}*2^{-cT}(P_c-P_{n-1})^2}{(W_c+W_{n-1}*2^{-cT})(W_c+W_{n-1}*2^{-cT}-1)}} \quad \text{Equation 17}$$

Equation 17 functions like the combined scatter over ($P_m$, $W_m$, $\sigma_m$) and ($P_{n-1}$, $W_{n-1}*2^{-cT}$, $\sigma_{n-1}$), since when $P_m \neq 0$, $P_c = P_m$, $W_c \approx W_m$ and $\sigma_c \approx \sigma_m$.

In the case of a still-market ($P_m=0$, $W_m=0$), $\sigma_n \approx \sqrt{\sigma_{n-1}^2 + \sigma_{ph}^2}$. That is, the scatter is bounded by at least one $\sigma_{ph}$. It makes sense that, when there is no price in market, the scatter is at least one $\sigma_{ph}$ (it is set at 1% of a Big Figure or one pip).

Following the example of Table 14, Table 15 shows the Benchmark Price Scatter:

TABLE 15

| Pm | Wm | $\sigma_m$ | Pn-1 | Wn-1 | $\sigma_{n-1}$ | Wm + Wn-1 * 2-ct | $\sigma_n$ |
|---|---|---|---|---|---|---|---|
| 0.9779835509 | 23.9375 | 0.0000622966 | 0.9778095128 | 19.0458 | 0.0000761207 | 33.4603999156 | 0.0001029197 |

Benchmark Price Error ($E_n$)

The Standard Error is a commonly used index of the error entailed in estimating a population mean based on the information in a random sample of size N:

$$E_n = \sqrt{\frac{\sigma^2}{N}}$$

In this case, $\sigma$ is the Benchmark Price Scatter $\sigma_n$, and $N = W_n = W_m + W_{n-1} * 2^{-cT} + W_{ph}$.

$$E_n = \sqrt{\frac{\sigma_n^2}{W_m + W_{n-1} * 2^{-cT} + W_{ph}}} \quad \text{Equation 18}$$

It can be seen that $E_n$ is always smaller than the Benchmark Price Scatter $\sigma_n$. The larger the weights, corresponding to more sample points, the smaller the error.

In the case of a still-market ($P_m=0$, $W_m=0$):

$$E_n = \frac{\sigma_n}{\sqrt{W_{n-1} * 2^{-cT} + W_{ph}}}$$

when $n \to \infty$, the Error $E_n \to \sigma_n/\sqrt{2*W_{ph}}$. When $W_{ph}=0.5*10^{-6}$, $E_n \to \sigma_n/\sqrt{0.000001}=1000*\sigma_n$.

In other words, if the scatter $\sigma_n$ is at one pip, then the Standard Error is at 10 big figures.

The Standard Error ($E_n$) has its special meaning, as explained below. $2*E_n$ defines the "95%-bracket" around Benchmark Price $P_n$. That is, in a still-market, if the scatter is one pip, then the "95%-bracket" is bounded by 20 big figures on each side of the Benchmark Price; if the scatter is two pips, then the "95%-bracket" is bounded by 40 big figures on each side of the Benchmark Price.

Continuing with the example of Table 15, the Benchmark Price Error can now be calculated.

$E_n$=sqrt($\sigma_n^2/(W_m+W_{n-1}*2^{-cT}+W_{ph})$)=sqrt
 (0.0001029197²/33.46040092)=0.0000177923.

Therefore, twice the Standard Error=2*0.0000177923=0.0000355847 (pips).

That is, at tick n, the Benchmark Price of 0.9779340193 has a 95% chance lying within 0.0000355847 pips of the true price P, or, the Benchmark Price of 0.9779340193 has a 95% chance satisfying:

P−0.0000355847<0.9779340193<P+0.0000355847

The Standard Error of the mean may be calculated as follows:

Central Limit Theorem

If P is a population of size m and S is a sample of P with size n (n<m), let MN(S) be the mean of S, and SD(S) be the Standard Deviation of S, then Central Limit Theorem states that:

(1) When n is large, the distribution of the means $M_i$ of ALL possible samples of size n is approximately a Normal Distribution (that is, $M_1$ $M_2$, ..., $M_k$ form a normal distribution);

(2) $MN(M_i)=MN(P)$

That is, the mean of the distribution of $M_i$ equals to the mean of the population.

defined as $$SD(M_i) = SD(P)/\text{sqrt}(n) \stackrel{\text{defined as}}{=\!=\!=\!=\!=\!=\!=} \text{Standard Error}(SE) \quad (3)$$

That is, the SD of the distribution of $M_i$ equals the SD of the population divided by the square root of n.

Since $M_i$ is a Normal Distribution, then the mean of a random sample S has a 68% chance of lying within one SE of the population mean, or a 95% change lying within two SE of the population mean:

MN(P)−2*SE<MN(S)<MN(P)+2*SE.

(Conversely, the population mean has a 68% chance of lying within one SE of the mean of a single randomly chosen sample S, and a 95% chance of lying within two SE of the mean of a single randomly chosen sample S).

SE Approximation

Since SD (P) is usually not available, it is a common practice when n is large to use the Standard Deviation of a sample S instead:

approximated by $SE=SD(M_i)=SD(P)/sqrt(n)=\!=\!=\!=\!=\!=\!=\!=\!=\!=\!=SD(S)/sqrt(n)$ Therefore, for any sample of size n the SE of the Mean can be calculated (approximated).

The following section gives some examples of Benchmark calculations following the Equations derived in the foregoing sections.

Example 1

This example is a summary of the examples used above. Deal Price=($P_d$, $W_d$, $\sigma_d$), Quote Price=($P_q$, $W_q$, $\sigma_q$), Market Price=($P_m$, $W_m$, $\sigma_m$), and Benchmark Price at n=($P_n$, $W_n$, $\sigma_n$)

| Deals | Price (P) | Weight (W) | P * W | W * (P − Pd)2 | Pd | Wd | $\sigma_d$ |
|---|---|---|---|---|---|---|---|
| 1 | 0.9781 | 2 | 1.956200 | 0.0000000250 | ↓ | ↓ | ↓ |
| 2 | 0.9780 | 2 | 1.956000 | 0.0000000003 | ↓ | ↓ | ↓ |
| 3 | 0.9781 | 1 | 0.978100 | 0.0000000125 | Equation 3 | Equation 2 | Equation 4 |

-continued

| | | | | | | | | |
|---|---|---|---|---|---|---|---|---|
| 4 | 0.9780 | 7 | 6.846000 | 0.0000000010 | ↓ | ↓ | ↓ | |
| 5 | 0.9779 | 5 | 4.889500 | 0.0000000389 | ↓ | ↓ | ↓ | |
| | Total: | 17 | 16.625800 | 0.0000000776 | ↓ | ↓ | ↓ | |
| | Deal Price: | | 0.9779882353 | | | | | |
| | (Pd) | | Scatter ($\sigma_d$): | 0.0000675831 | 0.9779882353 | 17.0000 | 0.0000675831 | |

| Bids | Price | Volume | Distance | Weight | Offers | Price | Volume | Distance | Weight |
|---|---|---|---|---|---|---|---|---|---|
| 1 | 0.9779 | 10 | 0 | 10.0000 | 1 | 0.9780 | 10 | 0 | 10.0000 |
| 2 | 0.9778 | 20 | 1 | 10.0000 | 2 | 0.9781 | 10 | 1 | 5.0000 |
| 3 | 0.9777 | 40 | 2 | 10.0000 | 3 | 0.9782 | 10 | 2 | 2.5000 |
| 4 | 0.9776 | 80 | 3 | 10.0000 | 4 | 0.9783 | 10 | 3 | 1.2500 |
| 5 | 0.9775 | 160 | 4 | 10.0000 | 5 | 0.9784 | 10 | 4 | 0.6250 |
| | | | Vb: | 50.0000 | | | | Vo: | 19.3750 |

| | | | | |
|---|---|---|---|---|
| | | Best Bid Pb | 0.9779 | Vb + Vo: | 69.3750 |
| | | Best Offer Po | 0.9780 | $\lambda$ * (Vb + Vo): | 6.9375 |
| | | $\lambda$ | 0.1 | | |

| | Pq | Wq | $\sigma_q$ |
|---|---|---|---|
| | Equation 8 | Equation 7 | Equation 9 |
| | 0.9779720721 | 6.93750 | 0.0000448645 |

| Deals | Price (P) | Weight (W) | $\lambda$ | W * (P − Pm)2 | Pm | Wm | $\sigma_m$ |
|---|---|---|---|---|---|---|---|
| 1 | 0.9781 | 2 | | 0.0000000271 | ↓ | ↓ | ↓ |
| 2 | 0.9780 | 2 | | 0.0000000005 | ↓ | ↓ | ↓ |
| 3 | 0.9781 | 1 | | 0.0000000136 | ↓ | ↓ | ↓ |
| 4 | 0.9780 | 7 | | 0.0000000019 | Equation 10 | Equation 11 | Equation 12 |
| 5 | 0.9779 | 5 | | 0.0000000349 | ↓ | ↓ | ↓ |
| Bid->Buy | 0.9780 | 50.000 | 0.1 | 0.0000000014 | ↓ | ↓ | ↓ |
| Offer->Sell | 0.9779 | 19.375 | 0.1 | 0.0000000135 | ↓ | ↓ | ↓ |
| | Total: | 23.937500 | | 0.0000000929 | ↓ | ↓ | ↓ |
| | | Scatter ($\sigma_m$) | | 0.0000622966 | 0.9779835509 | 23.9375 | 0.0000622966 |

Let T = 1 second

| Pn−1 | Wn−1 | $\sigma_{n-1}$ | Wm + Wn−1 * 2−ct | Pn | Wn | $\sigma_n$ | SE |
|---|---|---|---|---|---|---|---|
| 0.9778095128 | 19.0458 | 0.0000761207 | 33.46039992 | ↓ | ↓ | ↓ | ↓ |
| | | | | Equation 13 | Equation 14 | Equation 16 | Equation 17 |
| | | | | ↓ | ↓ | ↓ | ↓ |
| | | | | 0.9779340193 | 33.4604 | 0.0001029197 | 0.0000177923 |

| Pph | Wph |
|---|---|
| 0.9778095128 | 0.000001 |

Example 2.1

Quote only market: There are only two quotes in market. They are 1 pip apart, 1 million on each side. We want to find out Benchmark's ($P_n$, $W_n$, $\sigma_n$) and SE.

Note that when there is no deal, Market Price is the same as the Quote Price. By applying Benchmark formulas, we have:

| | | Quote Prices | | | | Benchmarks | | | |
|---|---|---|---|---|---|---|---|---|---|
| Bid | Vb | Offer | Vo | Pq | Wq | $\sigma_q$ | Pn | Wn | $\sigma_n$ | SE |
| | | | | | | | 0 | 0 | 0 | |
| 0.9800 | 1 | 0.9801 | 1 | 0.98005 | 0.2 | 0.000050 | 0.98005 | 0.2 | 0.000050 | 0.00011180 |
| 0.9800 | 1 | 0.9801 | 1 | 0.98005 | 0.2 | 0.000050 | 0.98005 | 0.3 | 0.000050 | 0.00009129 |
| 0.9800 | 1 | 0.9801 | 1 | 0.98005 | 0.2 | 0.000050 | 0.98005 | 0.35 | 0.000050 | 0.00008452 |
| 0.9800 | 1 | 0.9801 | 1 | 0.98005 | 0.2 | 0.000050 | 0.98005 | 0.375 | 0.000050 | 0.00008165 |
| 0.9800 | 1 | 0.9801 | 1 | 0.98005 | 0.2 | 0.000050 | 0.98005 | 0.3875 | 0.000050 | 0.00008032 |
| 0.9800 | 1 | 0.9801 | 1 | 0.98005 | 0.2 | 0.000050 | 0.98005 | 0.39375 | 0.000050 | 0.00007968 |
| 0.9800 | 1 | 0.9801 | 1 | 0.98005 | 0.2 | 0.000050 | 0.98005 | 0.396875 | 0.000050 | 0.00007937 |
| 0.9800 | 1 | 0.9801 | 1 | 0.98005 | 0.2 | 0.000050 | 0.98005 | 0.3984375 | 0.000050 | 0.00007921 |
| 0.9800 | 1 | 0.9801 | 1 | 0.98005 | 0.2 | 0.000050 | 0.98005 | 0.3992188 | 0.000050 | 0.00007913 |
| 0.9800 | 1 | 0.9801 | 1 | 0.98005 | 0.2 | 0.000050 | 0.98005 | 0.3996094 | 0.000050 | 0.00007910 |

-continued

| | | | | Quote Prices | | | Benchmarks | | | |
|---|---|---|---|---|---|---|---|---|---|---|
| Bid | Vb | Offer | Vo | Pq | Wq | $\sigma_q$ | Pn | Wn | $\sigma_n$ | SE |
| 0.9800 | 1 | 0.9801 | 1 | 0.98005 | 0.2 | 0.000050 | 0.98005 | 0.3998047 | 0.000050 | 0.00007908 |
| 0.9800 | 1 | 0.9801 | 1 | 0.98005 | 0.2 | 0.000050 | 0.98005 | 0.3999023 | 0.000050 | 0.00007907 |
| 0.9800 | 1 | 0.9801 | 1 | 0.98005 | 0.2 | 0.000050 | 0.98005 | 0.3999512 | 0.000050 | 0.00007906 |
| 0.9800 | 1 | 0.9801 | 1 | 0.98005 | 0.2 | 0.000050 | 0.98005 | 0.3999756 | 0.000050 | 0.00007906 |
| 0.9800 | 1 | 0.9801 | 1 | 0.98005 | 0.2 | 0.000050 | 0.98005 | 0.3999878 | 0.000050 | 0.00007906 |
| 0.9800 | 1 | 0.9801 | 1 | 0.98005 | 0.2 | 0.000050 | 0.98005 | 0.3999939 | 0.000050 | 0.00007906 |
| 0.9800 | 1 | 0.9801 | 1 | 0.98005 | 0.2 | 0.000050 | 0.98005 | 0.3999969 | 0.000050 | 0.00007906 |
| 0.9800 | 1 | 0.9801 | 1 | 0.98005 | 0.2 | 0.000050 | 0.98005 | 0.3999985 | 0.000050 | 0.00007906 |
| 0.9800 | 1 | 0.9801 | 1 | 0.98005 | 0.2 | 0.000050 | 0.98005 | 0.3999992 | 0.000050 | 0.00007906 |
| 0.9800 | 1 | 0.9801 | 1 | 0.98005 | 0.2 | 0.000050 | 0.98005 | 0.3999996 | 0.000050 | 0.00007906 |
| 0.9800 | 1 | 0.9801 | 1 | 0.98005 | 0.2 | 0.000050 | 0.98005 | 0.3999998 | 0.000050 | 0.00007906 |
| 0.9800 | 1 | 0.9801 | 1 | 0.98005 | 0.2 | 0.000050 | 0.98005 | 0.3999999 | 0.000050 | 0.00007906 |
| 0.9800 | 1 | 0.9801 | 1 | 0.98005 | 0.2 | 0.000050 | 0.98005 | 0.4 | 0.000050 | 0.00007906 |
| 0.9800 | 1 | 0.9801 | 1 | 0.98005 | 0.2 | 0.000050 | 0.98005 | 0.4 | 0.000050 | 0.00007906 |
| 0.9800 | 1 | 0.9801 | 1 | 0.98005 | 0.2 | 0.000050 | 0.98005 | 0.4 | 0.000050 | 0.00007906 |

SE = 0.00007906,
2 * SE = 0.0001581,
4 * SE = 0.000316

Figure 2:
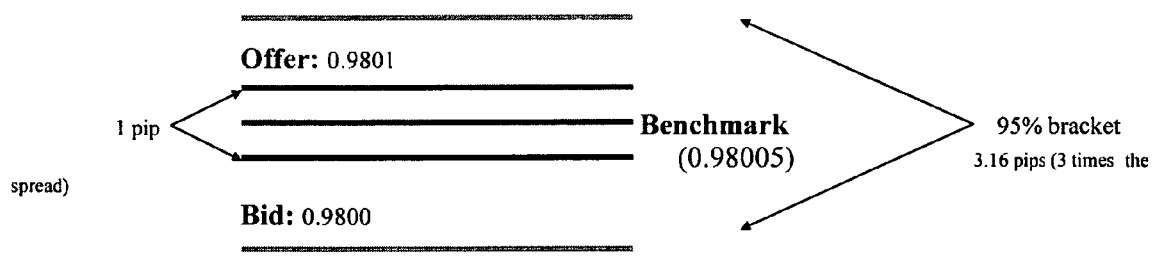
FIG. 2 is an example of a benchmark established in a quote only market.

The relationship between the Benchmark and the Bid and offer prices is shown in FIG. 2. A number of conclusions can be drawn as follows:

(1) The Benchmark Price $P_n$ is in the middle of the bid and offer, $(P_b + P_o)/2$, as expected.
(2) The Benchmark Price Weight $W_n$ converges to (2 × total volume × λ). Namely, $W_n$ -> 2 × 2 × 0.1 = 0.4 after 16 rounds (16 seconds).
(3) The Benchmark Price Scatter $\sigma_n$ is ½ of the quote spread, as expected. SE is larger the $D_n$ because $W_n$ is small (0.4)

Example 2.2

Quote only market: There are only two quotes in market. They are 2 pips apart, 1 million on each side. We want to find out $(P_n, W_n, \sigma_n)$ and SE. This example is the same as 2.1 above, except for the larger spread.

Figure 3:
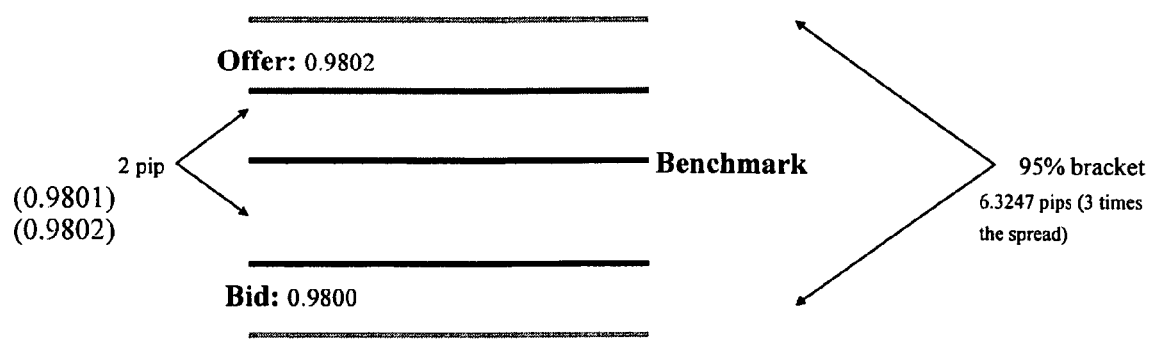
FIG. 3 is a further example of a benchmark established in a quote only market.

Note that when there is no deal, Market Price is the same as the Quote Price. By applying Benchmark formulas, we have:

The relationship between the Benchmark and the Bid and offer prices is shown in FIG. 3. A number of conclusions can be drawn as follows:

There is no change for (1) and (2). But the wider spread changes an and SE:

(1) $P_n$ is at the middle of the bid and offer, $(P_b+P_o)/2$, as expected.

| | | | | Quote Prices | | | Benchmarks | | | |
|---|---|---|---|---|---|---|---|---|---|---|
| Bid | Vb | Offer | Vo | Pq | Wq | $\sigma_q$ | Pn | Wn | $\sigma_n$ | SE |
| | | | | | | | 0 | 0 | 0 | |
| 0.9800 | 1 | 0.9802 | 1 | 0.9801 | 0.2 | 0.000100 | 0.9801 | 0.2 | 0.000100 | 0.00022361 |
| 0.9800 | 1 | 0.9802 | 1 | 0.9801 | 0.2 | 0.000100 | 0.9801 | 0.3 | 0.000100 | 0.00018257 |
| 0.9800 | 1 | 0.9802 | 1 | 0.9801 | 0.2 | 0.000100 | 0.9801 | 0.35 | 0.000100 | 0.00016903 |
| 0.9800 | 1 | 0.9802 | 1 | 0.9801 | 0.2 | 0.000100 | 0.9801 | 0.375 | 0.000100 | 0.00016330 |
| 0.9800 | 1 | 0.9802 | 1 | 0.9801 | 0.2 | 0.000100 | 0.9801 | 0.3875 | 0.000100 | 0.00016064 |
| 0.9800 | 1 | 0.9802 | 1 | 0.9801 | 0.2 | 0.000100 | 0.9801 | 0.39375 | 0.000100 | 0.00015936 |
| 0.9800 | 1 | 0.9802 | 1 | 0.9801 | 0.2 | 0.000100 | 0.9801 | 0.396875 | 0.000100 | 0.00015874 |
| 0.9800 | 1 | 0.9802 | 1 | 0.9801 | 0.2 | 0.000100 | 0.9801 | 0.3984375 | 0.000100 | 0.00015842 |
| 0.9800 | 1 | 0.9802 | 1 | 0.9801 | 0.2 | 0.000100 | 0.9801 | 0.3992188 | 0.000100 | 0.00015827 |
| 0.9800 | 1 | 0.9802 | 1 | 0.9801 | 0.2 | 0.000100 | 0.9801 | 0.3996094 | 0.000100 | 0.00015819 |
| 0.9800 | 1 | 0.9802 | 1 | 0.9801 | 0.2 | 0.000100 | 0.9801 | 0.3998047 | 0.000100 | 0.00015815 |
| 0.9800 | 1 | 0.9802 | 1 | 0.9801 | 0.2 | 0.000100 | 0.9801 | 0.3999023 | 0.000100 | 0.00015813 |
| 0.9800 | 1 | 0.9802 | 1 | 0.9801 | 0.2 | 0.000100 | 0.9801 | 0.3999512 | 0.000100 | 0.00015812 |
| 0.9800 | 1 | 0.9802 | 1 | 0.9801 | 0.2 | 0.000100 | 0.9801 | 0.3999756 | 0.000100 | 0.00015812 |
| 0.9800 | 1 | 0.9802 | 1 | 0.9801 | 0.2 | 0.000100 | 0.9801 | 0.3999878 | 0.000100 | 0.00015812 |
| 0.9800 | 1 | 0.9802 | 1 | 0.9801 | 0.2 | 0.000100 | 0.9801 | 0.3999939 | 0.000100 | 0.00015812 |
| 0.9800 | 1 | 0.9802 | 1 | 0.9801 | 0.2 | 0.000100 | 0.9801 | 0.3999969 | 0.000100 | 0.00015811 |
| 0.9800 | 1 | 0.9802 | 1 | 0.9801 | 0.2 | 0.000100 | 0.9801 | 0.3999985 | 0.000100 | 0.00015811 |
| 0.9800 | 1 | 0.9802 | 1 | 0.9801 | 0.2 | 0.000100 | 0.9801 | 0.3999992 | 0.000100 | 0.00015811 |
| 0.9800 | 1 | 0.9802 | 1 | 0.9801 | 0.2 | 0.000100 | 0.9801 | 0.3999996 | 0.000100 | 0.00015811 |
| 0.9800 | 1 | 0.9802 | 1 | 0.9801 | 0.2 | 0.000100 | 0.9801 | 0.3999998 | 0.000100 | 0.00015811 |
| 0.9800 | 1 | 0.9802 | 1 | 0.9801 | 0.2 | 0.000100 | 0.9801 | 0.3999999 | 0.000100 | 0.00015811 |
| 0.9800 | 1 | 0.9802 | 1 | 0.9801 | 0.2 | 0.000100 | 0.9801 | 0.4 | 0.000100 | 0.00015811 |
| 0.9800 | 1 | 0.9802 | 1 | 0.9801 | 0.2 | 0.000100 | 0.9801 | 0.4 | 0.000100 | 0.00015811 |
| 0.9800 | 1 | 0.9802 | 1 | 0.9801 | 0.2 | 0.000100 | 0.9801 | 0.4 | 0.000100 | 0.00015811 |

SE = 0.00015811,
2 * SE = 0.0003162,
4 * SE = 0.00063247

(2) No weight change, $W_n$ converges to (2×total volume×λ)=2×2×0.1=0.4 after 16 rounds.

(3) $\sigma_n$ is ½ of the quote spread, as expected. But since the spread is twice as large as in Example 2.1, $\sigma_n$ and SE both double their values. It makes sense: wider spread makes the market less certain.

Example 2.3

Quote only market: There are only two quotes in market. They are 1 pip apart, 2 million on each side. We want to find out ($P_n$, $W_n$, $\sigma_n$) and SE. (This example is the same as 2.1, only with larger volumes).

Note that when there is no deal, Market Price is the same as the Quote Price. By applying Benchmark formulas, we have:

There is no change for (1) and $\sigma_n$; Weight doubles; The doubling of the Weight makes SE smaller:

1) $P_n$ is at the middle of the bid and offer, $(P_b+P_o)/2$, as expected.

(2) Weight doubles. $W_n$ converges to (2×total volume×λ)=2×4×0.1=0.8 after 16 rounds.

(3) $\sigma_n$ is ½ of the quote spread, as expected. But since the heavier Weight (more certainty), SE decreases almost 30% comparing with Example 2.1 (it is inversely proportional to sqrt(Weight)).

Example 3.1

Deal only market: There are only one 1 million deals occurring every second at the same price. We want to find out ($P_n$, $W_n$, $\sigma_n$) and SE.

|  |  |  |  | Quote Prices | | | Benchmarks | | | |
|---|---|---|---|---|---|---|---|---|---|---|
| Bid | Vb | Offer | Vo | Pq | Wq | $\sigma_q$ | Pn | Wn | $\sigma_n$ | SE |
|  |  |  |  |  |  |  | 0 | 0 | 0 |  |
| 0.9800 | 2 | 0.9801 | 2 | 0.98005 | 0.4 | 0.000050 | 0.98005 | 0.4 | 0.000050 | 0.00007906 |
| 0.9800 | 2 | 0.9801 | 2 | 0.98005 | 0.4 | 0.000050 | 0.98005 | 0.6 | 0.000050 | 0.00006455 |
| 0.9800 | 2 | 0.9801 | 2 | 0.98005 | 0.4 | 0.000050 | 0.98005 | 0.7 | 0.000050 | 0.00005976 |
| 0.9800 | 2 | 0.9801 | 2 | 0.98005 | 0.4 | 0.000050 | 0.98005 | 0.75 | 0.000050 | 0.00005774 |
| 0.9800 | 2 | 0.9801 | 2 | 0.98005 | 0.4 | 0.000050 | 0.98005 | 0.775 | 0.000050 | 0.00005680 |
| 0.9800 | 2 | 0.9801 | 2 | 0.98005 | 0.4 | 0.000050 | 0.98005 | 0.7875 | 0.000050 | 0.00005634 |
| 0.9800 | 2 | 0.9801 | 2 | 0.98005 | 0.4 | 0.000050 | 0.98005 | 0.79375 | 0.000050 | 0.00005612 |
| 0.9800 | 2 | 0.9801 | 2 | 0.98005 | 0.4 | 0.000050 | 0.98005 | 0.796875 | 0.000050 | 0.00005601 |
| 0.9800 | 2 | 0.9801 | 2 | 0.98005 | 0.4 | 0.000050 | 0.98005 | 0.7984375 | 0.000050 | 0.00005596 |
| 0.9800 | 2 | 0.9801 | 2 | 0.98005 | 0.4 | 0.000050 | 0.98005 | 0.7992188 | 0.000050 | 0.00005593 |
| 0.9800 | 2 | 0.9801 | 2 | 0.98005 | 0.4 | 0.000050 | 0.98005 | 0.7996094 | 0.000050 | 0.00005592 |
| 0.9800 | 2 | 0.9801 | 2 | 0.98005 | 0.4 | 0.000050 | 0.98005 | 0.7998047 | 0.000050 | 0.00005591 |
| 0.9800 | 2 | 0.9801 | 2 | 0.98005 | 0.4 | 0.000050 | 0.98005 | 0.7999023 | 0.000050 | 0.00005591 |
| 0.9800 | 2 | 0.9801 | 2 | 0.98005 | 0.4 | 0.000050 | 0.98005 | 0.7999512 | 0.000050 | 0.00005590 |
| 0.9800 | 2 | 0.9801 | 2 | 0.98005 | 0.4 | 0.000050 | 0.98005 | 0.7999756 | 0.000050 | 0.00005590 |
| 0.9800 | 2 | 0.9801 | 2 | 0.98005 | 0.4 | 0.000050 | 0.98005 | 0.7999878 | 0.000050 | 0.00005590 |
| 0.9800 | 2 | 0.9801 | 2 | 0.98005 | 0.4 | 0.000050 | 0.98005 | 0.7999939 | 0.000050 | 0.00005590 |
| 0.9800 | 2 | 0.9801 | 2 | 0.98005 | 0.4 | 0.000050 | 0.98005 | 0.7999969 | 0.000050 | 0.00005590 |
| 0.9800 | 2 | 0.9801 | 2 | 0.98005 | 0.4 | 0.000050 | 0.98005 | 0.7999985 | 0.000050 | 0.00005590 |
| 0.9800 | 2 | 0.9801 | 2 | 0.98005 | 0.4 | 0.000050 | 0.98005 | 0.7999992 | 0.000050 | 0.00005590 |
| 0.9800 | 2 | 0.9801 | 2 | 0.98005 | 0.4 | 0.000050 | 0.98005 | 0.7999996 | 0.000050 | 0.00005590 |
| 0.9800 | 2 | 0.9801 | 2 | 0.98005 | 0.4 | 0.000050 | 0.98005 | 0.7999998 | 0.000050 | 0.00005590 |
| 0.9800 | 2 | 0.9801 | 2 | 0.98005 | 0.4 | 0.000050 | 0.98005 | 0.7999999 | 0.000050 | 0.00005590 |
| 0.9800 | 2 | 0.9801 | 2 | 0.98005 | 0.4 | 0.000050 | 0.98005 | 0.8 | 0.000050 | 0.00005590 |
| 0.9800 | 2 | 0.9801 | 2 | 0.98005 | 0.4 | 0.000050 | 0.98005 | 0.8 | 0.000050 | 0.00005590 |

SE = 0.00005590,
2 * SE = 0.0001118,
4 * SE = 0.00022361

Figure 4:
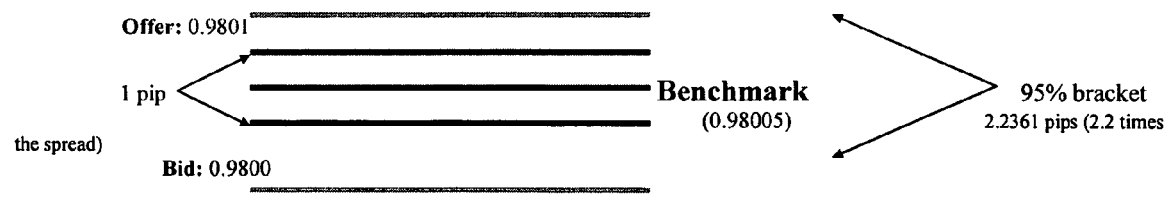
FIG. 4 is a still further example of a benchmark established in a quote only market.

The relationship between the Benchmark and the Bid and offer prices is shown in FIG. 4. A number of conclusions can be drawn as follows:

Note that when there is no quote, Market Price is the same as the Deal Price. By applying Benchmark formulas, we have:

|  |  | Deal Prices | | | Benchmarks | | | |
|---|---|---|---|---|---|---|---|---|
| Deal | V | Pd | Wd | $\sigma_d$ | Pn | Wn | $\sigma_n$ | SE |
|  |  |  |  |  | 0.00000 | 0 | 0.000000 |  |
| 0.9800 | 1 | 0.98000 | 1 | 0.00000000 | 0.98000 | 1 | 0.000000 | 0.00000000 |
| 0.9800 | 1 | 0.98000 | 1 | 0.00000000 | 0.98000 | 1.5 | 0.000000 | 0.00000000 |
| 0.9800 | 1 | 0.98000 | 1 | 0.00000000 | 0.98000 | 1.75 | 0.000000 | 0.00000000 |
| 0.9800 | 1 | 0.98000 | 1 | 0.00000000 | 0.98000 | 1.875 | 0.000000 | 0.00000000 |
| 0.9800 | 1 | 0.98000 | 1 | 0.00000000 | 0.98000 | 1.9375 | 0.000000 | 0.00000000 |
| 0.9800 | 1 | 0.98000 | 1 | 0.00000000 | 0.98000 | 1.96875 | 0.000000 | 0.00000000 |
| 0.9800 | 1 | 0.98000 | 1 | 0.00000000 | 0.98000 | 1.984375 | 0.000000 | 0.00000000 |
| 0.9800 | 1 | 0.98000 | 1 | 0.00000000 | 0.98000 | 1.9921875 | 0.000000 | 0.00000000 |
| 0.9800 | 1 | 0.98000 | 1 | 0.00000000 | 0.98000 | 1.9960938 | 0.000000 | 0.00000000 |
| 0.9800 | 1 | 0.98000 | 1 | 0.00000000 | 0.98000 | 1.9980469 | 0.000000 | 0.00000000 |

-continued

| Deal | V | Deal Prices Pd | Wd | $\sigma_d$ | Benchmarks Pn | Wn | $\sigma_n$ | SE |
|---|---|---|---|---|---|---|---|---|
| 0.9800 | 1 | 0.98000 | 1 | 0.00000000 | 0.98000 | 1.9990234 | 0.000000 | 0.00000000 |
| 0.9800 | 1 | 0.98000 | 1 | 0.00000000 | 0.98000 | 1.9995117 | 0.000000 | 0.00000000 |
| 0.9800 | 1 | 0.98000 | 1 | 0.00000000 | 0.98000 | 1.9997559 | 0.000000 | 0.00000000 |
| 0.9800 | 1 | 0.98000 | 1 | 0.00000000 | 0.98000 | 1.9998779 | 0.000000 | 0.00000000 |
| 0.9800 | 1 | 0.98000 | 1 | 0.00000000 | 0.98000 | 1.999939 | 0.000000 | 0.00000000 |
| 0.9800 | 1 | 0.98000 | 1 | 0.00000000 | 0.98000 | 1.9999695 | 0.000000 | 0.00000000 |
| 0.9800 | 1 | 0.98000 | 1 | 0.00000000 | 0.98000 | 1.9999847 | 0.000000 | 0.00000000 |
| 0.9800 | 1 | 0.98000 | 1 | 0.00000000 | 0.98000 | 1.9999924 | 0.000000 | 0.00000000 |
| 0.9800 | 1 | 0.98000 | 1 | 0.00000000 | 0.98000 | 1.9999962 | 0.000000 | 0.00000000 |
| 0.9800 | 1 | 0.98000 | 1 | 0.00000000 | 0.98000 | 1.9999981 | 0.000000 | 0.00000000 |
| 0.9800 | 1 | 0.98000 | 1 | 0.00000000 | 0.98000 | 1.999999 | 0.000000 | 0.00000000 |
| 0.9800 | 1 | 0.98000 | 1 | 0.00000000 | 0.98000 | 1.9999995 | 0.000000 | 0.00000000 |
| 0.9800 | 1 | 0.98000 | 1 | 0.00000000 | 0.98000 | 1.9999998 | 0.000000 | 0.00000000 |
| 0.9800 | 1 | 0.98000 | 1 | 0.00000000 | 0.98000 | 1.9999999 | 0.000000 | 0.00000000 |
| 0.9800 | 1 | 0.98000 | 1 | 0.00000000 | 0.98000 | 1.9999999 | 0.000000 | 0.00000000 |
| 0.9800 | 1 | 0.98000 | 1 | 0.00000000 | 0.98000 | 2 | 0.000000 | 0.00000000 |

Figures 5, 6:
FIG. 5 is an example of a benchmark established in a deal only market.
FIG. 6 is a further example of a benchmark established in a deal only market.

FIG. 5 shows the relationship between Deal Price and Benchmark price.

The following conclusions can be drawn:
(1) The Benchmark Price $P_n$ is at the deal price, as expected.
(2) The Benchmark Price Weight $W_n$ converges to (2×total volume Namely, $W_n \to 2 \times 1 = 2$ after 22 rounds (22 seconds).
(3) The Benchmark Price Scatter $\sigma_n$ and SE are zeros, as expected. Since there is only one deal in market.

Example 3.2

Deal only market: There is only one 1 million deal occurring every second alternately at two different prices one pip apart. We want to find out $(P_n, W_n, \sigma_n)$ and SE. This example is like Example 3.1, only deal prices are not at a steady price but "vibrate" one-pip apart. By applying the formulas, we have:

| Deal | V | Deal | V | Deal Prices Pd | Wd | $\sigma_d$ | Benchmarks Pn | Wn | $\sigma_n$ | SE |
|---|---|---|---|---|---|---|---|---|---|---|
| | | | | | | | 0.00000 | 0 | 0.000000 | |
| 0.9800 | 1 | | | 0.98000 | 1 | 0.00000000 | 0.98000 | 1 | 0.000000 | 0.00000000 |
| | | 0.9801 | 1 | 0.98010 | 1 | 0.00000000 | 0.98007 | 1.5 | 0.000047 | 0.00003849 |
| 0.9800 | 1 | | | 0.98000 | 1 | 0.00000000 | 0.98003 | 1.75 | 0.000045 | 0.00003415 |
| | | 0.9801 | 1 | 0.98010 | 1 | 0.00000000 | 0.98007 | 1.875 | 0.000047 | 0.00003443 |
| 0.9800 | 1 | | | 0.98000 | 1 | 0.00000000 | 0.98003 | 1.9375 | 0.000047 | 0.00003358 |
| | | 0.9801 | 1 | 0.98010 | 1 | 0.00000000 | 0.98007 | 1.96875 | 0.000047 | 0.00003360 |
| 0.9800 | 1 | | | 0.98000 | 1 | 0.00000000 | 0.98003 | 1.984375 | 0.000047 | 0.00003340 |
| | | 0.9801 | 1 | 0.98010 | 1 | 0.00000000 | 0.98007 | 1.9921875 | 0.000047 | 0.00003340 |
| 0.9800 | 1 | | | 0.98000 | 1 | 0.00000000 | 0.98003 | 1.9960938 | 0.000047 | 0.00003335 |
| | | 0.9801 | 1 | 0.98010 | 1 | 0.00000000 | 0.98007 | 1.9980469 | 0.000047 | 0.00003335 |
| 0.9800 | 1 | | | 0.98000 | 1 | 0.00000000 | 0.98003 | 1.9990234 | 0.000047 | 0.00003334 |
| | | 0.9801 | 1 | 0.98010 | 1 | 0.00000000 | 0.98007 | 1.9995117 | 0.000047 | 0.00003334 |
| 0.9800 | 1 | | | 0.98000 | 1 | 0.00000000 | 0.98003 | 1.9997559 | 0.000047 | 0.00003333 |
| | | 0.9801 | 1 | 0.98010 | 1 | 0.00000000 | 0.98007 | 1.9998779 | 0.000047 | 0.00003333 |
| 0.9800 | 1 | | | 0.98000 | 1 | 0.00000000 | 0.98003 | 1.999939 | 0.000047 | 0.00003333 |
| | | 0.9801 | 1 | 0.98010 | 1 | 0.00000000 | 0.98007 | 1.9999695 | 0.000047 | 0.00003333 |
| 0.9800 | 1 | | | 0.98000 | 1 | 0.00000000 | 0.98003 | 1.9999847 | 0.000047 | 0.00003333 |
| | | 0.9801 | 1 | 0.98010 | 1 | 0.00000000 | 0.98007 | 1.9999924 | 0.000047 | 0.00003333 |
| 0.9800 | 1 | | | 0.98000 | 1 | 0.00000000 | 0.98003 | 1.9999962 | 0.000047 | 0.00003333 |
| | | 0.9801 | 1 | 0.98010 | 1 | 0.00000000 | 0.98007 | 1.9999981 | 0.000047 | 0.00003333 |
| 0.9800 | 1 | | | 0.98000 | 1 | 0.00000000 | 0.98003 | 1.999999 | 0.000047 | 0.00003333 |
| | | 0.9801 | 1 | 0.98010 | 1 | 0.00000000 | 0.98007 | 1.9999995 | 0.000047 | 0.00003333 |
| 0.9800 | 1 | | | 0.98000 | 1 | 0.00000000 | 0.98003 | 1.9999998 | 0.000047 | 0.00003333 |
| | | 0.9801 | 1 | 0.98010 | 1 | 0.00000000 | 0.98007 | 1.9999999 | 0.000047 | 0.00003333 |
| 0.9800 | 1 | | | 0.98000 | 1 | 0.00000000 | 0.98003 | 1.9999999 | 0.000047 | 0.00003333 |
| | | 0.9801 | 1 | 0.98010 | 1 | 0.00000000 | 0.98007 | 2 | 0.000047 | 0.00003333 |

SE = 0.00003333,
2 * SE = 0.000067,
4 * SE = 0.00013

FIG. 6 shows the relationship between Deal Prices and Benchmarks over time.

From FIG. 6, we can conclude:

There is no change for Weight, but everything else changes:
(1) The Benchmark Price $P_n$ also "vibrates" in between deal prices, but with only a 40% "amplitude" of the deals. This is because of the Benchmark at tick n is smoothed by the price at the previous tick.

(2) The Benchmark Price Weight $W_n$ converges to (2×total volume)=2×1=2.
(3) The Benchmark Scatter is at 0.47 pips (47% of the deal price spread).

Example 3.3

Deal only market: There are only two 1 million deals occurring every second at two different prices one-pip apart. We want to find out ($P_n$, $W_n$, $\sigma_n$) and SE. By applying Benchmark formulas, we have:

| Deal | V | Deal | V | Deal Prices | | | Benchmarks | | | |
|---|---|---|---|---|---|---|---|---|---|---|
| | | | | Pd | Wd | $\sigma_d$ | Pn | Wn | $\sigma_n$ | SE |
| | | | | | | | 0.00000 | 0 | 0.000000 | |
| 0.9800 | 1 | 0.9801 | 1 | 0.98005 | 2 | 0.00005000 | 0.98005 | 2 | 0.000050 | 0.00003536 |
| 0.9800 | 1 | 0.9801 | 1 | 0.98005 | 2 | 0.00005000 | 0.98005 | 3 | 0.000050 | 0.00002887 |
| 0.9800 | 1 | 0.9801 | 1 | 0.98005 | 2 | 0.00005000 | 0.98005 | 3.5 | 0.000050 | 0.00002673 |
| 0.9800 | 1 | 0.9801 | 1 | 0.98005 | 2 | 0.00005000 | 0.98005 | 3.75 | 0.000050 | 0.00002582 |
| 0.9800 | 1 | 0.9801 | 1 | 0.98005 | 2 | 0.00005000 | 0.98005 | 3.875 | 0.000050 | 0.00002540 |
| 0.9800 | 1 | 0.9801 | 1 | 0.98005 | 2 | 0.00005000 | 0.98005 | 3.9375 | 0.000050 | 0.00002520 |
| 0.9800 | 1 | 0.9801 | 1 | 0.98005 | 2 | 0.00005000 | 0.98005 | 3.96875 | 0.000050 | 0.00002510 |
| 0.9800 | 1 | 0.9801 | 1 | 0.98005 | 2 | 0.00005000 | 0.98005 | 3.984375 | 0.000050 | 0.00002505 |
| 0.9800 | 1 | 0.9801 | 1 | 0.98005 | 2 | 0.00005000 | 0.98005 | 3.9921875 | 0.000050 | 0.00002502 |
| 0.9800 | 1 | 0.9801 | 1 | 0.98005 | 2 | 0.00005000 | 0.98005 | 3.9960938 | 0.000050 | 0.00002501 |
| 0.9800 | 1 | 0.9801 | 1 | 0.98005 | 2 | 0.00005000 | 0.98005 | 3.9980469 | 0.000050 | 0.00002501 |
| 0.9800 | 1 | 0.9801 | 1 | 0.98005 | 2 | 0.00005000 | 0.98005 | 3.9990234 | 0.000050 | 0.00002500 |
| 0.9800 | 1 | 0.9801 | 1 | 0.98005 | 2 | 0.00005000 | 0.98005 | 3.9995117 | 0.000050 | 0.00002500 |
| 0.9800 | 1 | 0.9801 | 1 | 0.98005 | 2 | 0.00005000 | 0.98005 | 3.9997559 | 0.000050 | 0.00002500 |
| 0.9800 | 1 | 0.9801 | 1 | 0.98005 | 2 | 0.00005000 | 0.98005 | 3.9998779 | 0.000050 | 0.00002500 |
| 0.9800 | 1 | 0.9801 | 1 | 0.98005 | 2 | 0.00005000 | 0.98005 | 3.999939 | 0.000050 | 0.00002500 |
| 0.9800 | 1 | 0.9801 | 1 | 0.98005 | 2 | 0.00005000 | 0.98005 | 3.9999695 | 0.000050 | 0.00002500 |
| 0.9800 | 1 | 0.9801 | 1 | 0.98005 | 2 | 0.00005000 | 0.98005 | 3.9999847 | 0.000050 | 0.00002500 |
| 0.9800 | 1 | 0.9801 | 1 | 0.98005 | 2 | 0.00005000 | 0.98005 | 3.9999924 | 0.000050 | 0.00002500 |
| 0.9800 | 1 | 0.9801 | 1 | 0.98005 | 2 | 0.00005000 | 0.98005 | 3.9999962 | 0.000050 | 0.00002500 |
| 0.9800 | 1 | 0.9801 | 1 | 0.98005 | 2 | 0.00005000 | 0.98005 | 3.9999981 | 0.000050 | 0.00002500 |
| 0.9800 | 1 | 0.9801 | 1 | 0.98005 | 2 | 0.00005000 | 0.98005 | 3.999999 | 0.000050 | 0.00002500 |
| 0.9800 | 1 | 0.9801 | 1 | 0.98005 | 2 | 0.00005000 | 0.98005 | 3.9999995 | 0.000050 | 0.00002500 |
| 0.9800 | 1 | 0.9801 | 1 | 0.98005 | 2 | 0.00005000 | 0.98005 | 3.9999998 | 0.000050 | 0.00002500 |
| 0.9800 | 1 | 0.9801 | 1 | 0.98005 | 2 | 0.00005000 | 0.98005 | 3.9999999 | 0.000050 | 0.00002500 |
| 0.9800 | 1 | 0.9801 | 1 | 0.98005 | 2 | 0.00005000 | 0.98005 | 3.9999999 | 0.000050 | 0.00002500 |

SE = 0.00002500,
2 * SE = 0.00005000,
4 * SE = 0.0001

Figure 7:
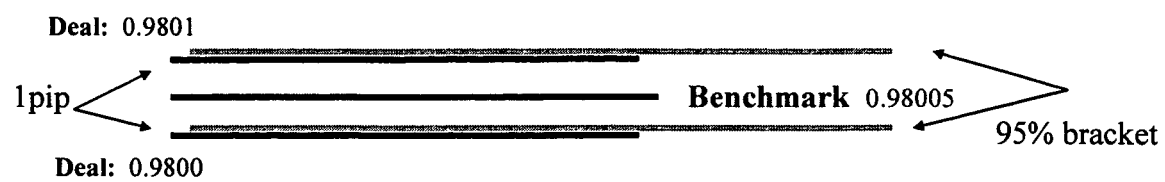
FIG. 7 is a still further example of a benchmark established in a deal only market.

FIG. 7 shows the relationship between deal prices and Benchmark prices from which one may conclude:

There is no change for Weight (1) but everything else changes:

(1) The Benchmark Price $P_n$ is at the middle of deal prices, as expected.
(2) The Benchmark Price Weight $W_n$ converges to (2×total volume)=2×2=4.
(3) The Benchmark Scatter is at 0.5 pips (50% of the deal price spread). SE decreases compared to Example 3.2 above, as the Weight has doubled, and SE is inversely proportional to sqrt(Weight).

Figure 8:
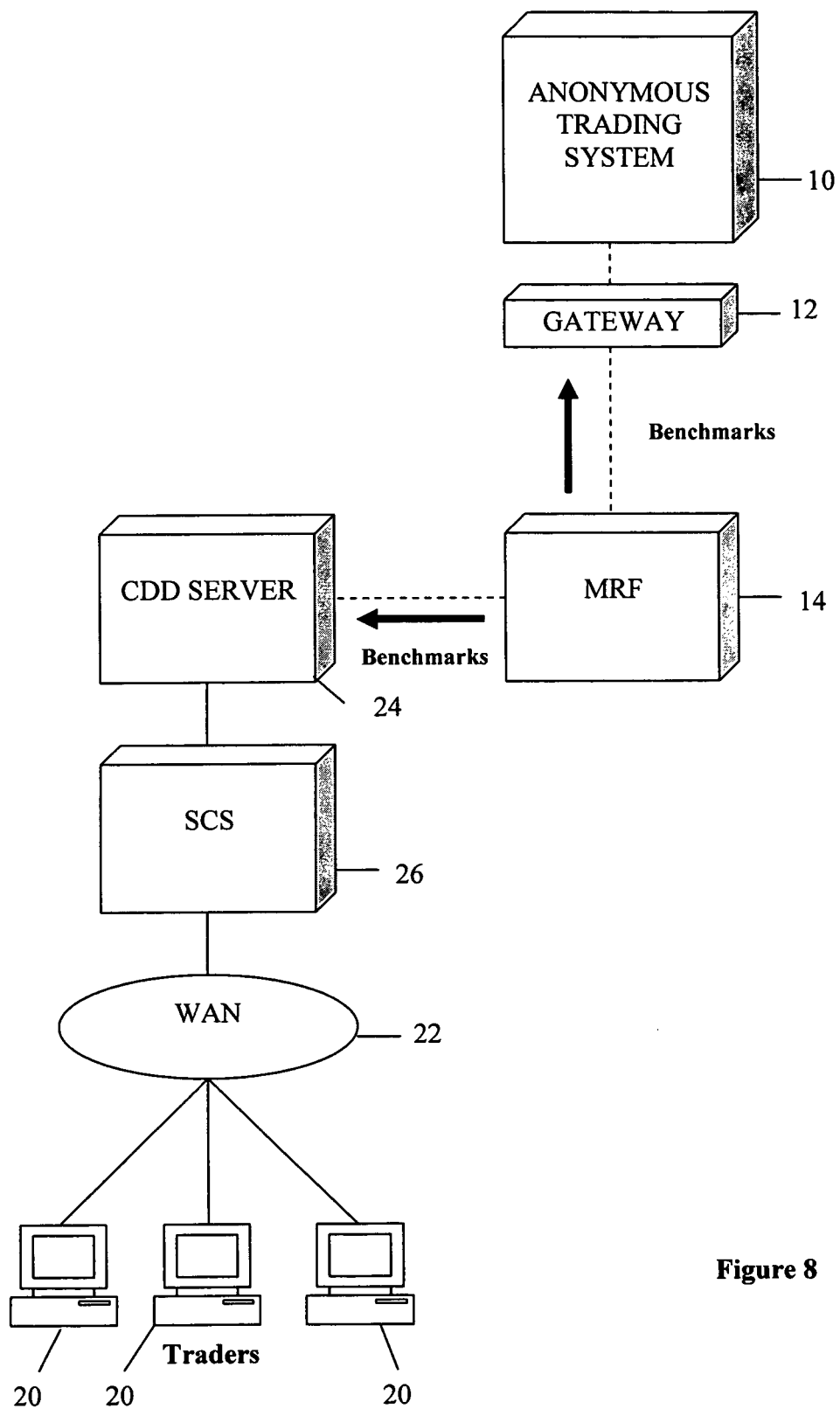
FIG. 8 is a schematic block diagram of a system for implementing calculating and delivering benchmarks to traders.
Figure 9:
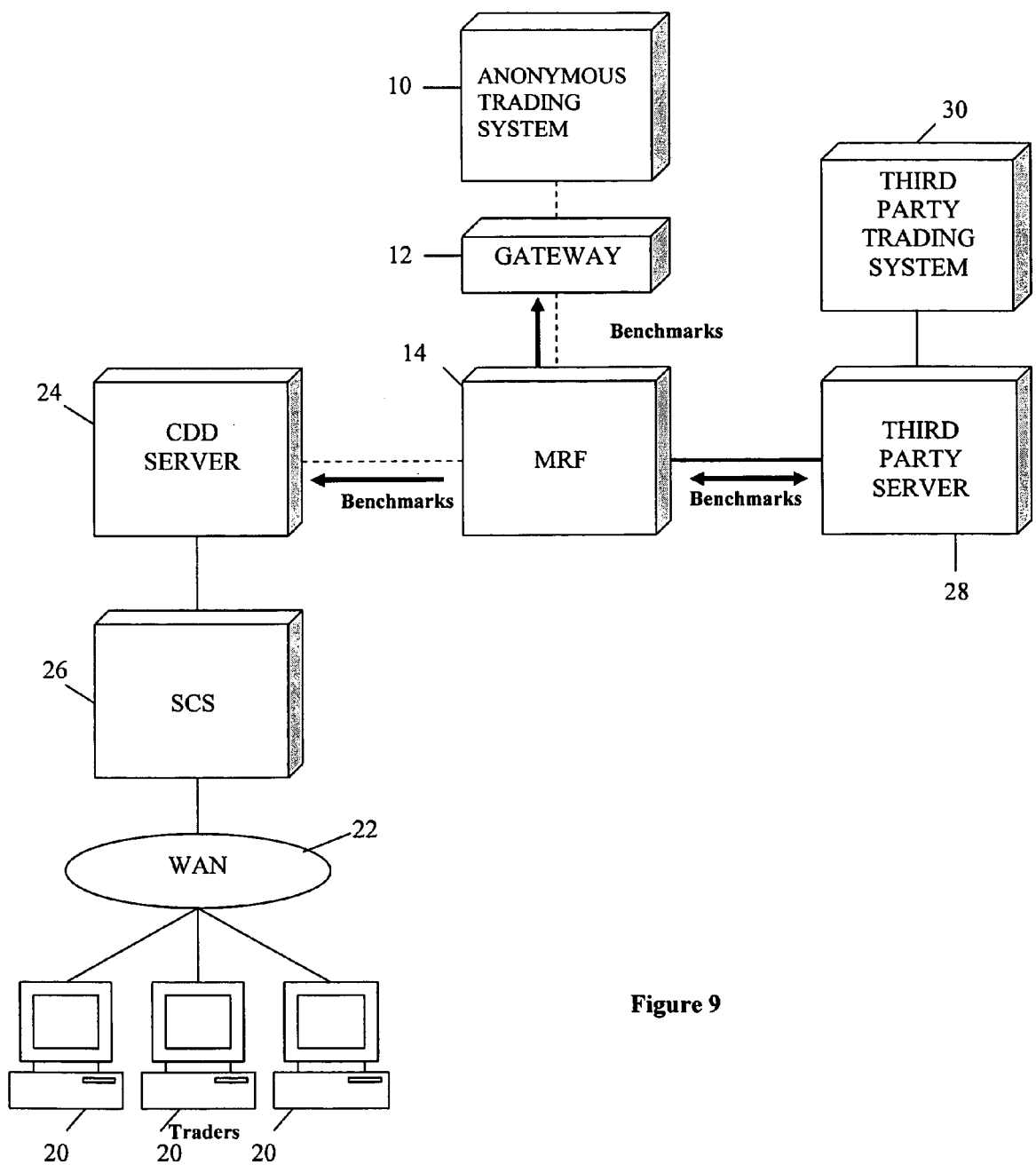
FIG. 9 is a schematic block diagram of a further embodiment of a system for implementing calculating and delivering benchmarks to traders in which benchmarks are also exchanged with a third party.

Having discussed how the Benchmarks are derived, the following description details how a system may be set up to calculate benchmarks and distribute them to traders. FIGS. 8 and 9 show two examples of systems for deriving and providing benchmarks to traders. In the system of FIG. 8, benchmarks are derived from price and deal data obtained from a single source. In that of FIG. 9 they are derived from priced and deal data supplied from more than one source.

From the discussion above, it is clear that for a benchmark to be calculated for a given currency pair, the previous benchmark must be available together with bids and offer prices entered into the system since the last benchmark together with the prices of deals done in the time since the last benchmark was calculated.

These bid and offer prices and deals are conveniently supplied from a trading system, for example an anonymous trading system such as that described in U.S. Pat. No. 6,014,627 of Togher et al. However, the information could be supplied from any suitable trading system, trading in the instrument to which the benchmark relates. Such a system must provide price and deal information and may or may not be anonymous. Bid/offer prices and deal prices may even be supplied from a non-computerized source such as an open out cry market or a voice broker.

Most trading systems enable traders to trade a variety of currency pairs. For example, USD: EUR, USA:JPY, USD:CAD; EUR:JPY; EUR:CAD and CAD:JPY and other GB currency pairs. In a preferred embodiment the system will establish a benchmark every t seconds for each of these currency pairs as well as other currency pairs that may be traded. The benchmarks will then be communicated to traders trading on the system and to traders trading on other systems, for example on conversational systems or direct dealing systems. The benchmarks may also be released more generally into the financial community.

In the embodiment of FIG. 8, the anonymous trading system is shown at 10. The price and deal information is passed via a gateway 12 to a market rate feed server 14 where the benchmark calculation is performed according to the algorithm described above. Market Rate Feeders (MRF) are, in themselves, a well-known tool for distributing price information from a source to a number of subscribers, however it is not conventional for them to calculate benchmarks.

The system of U.S. Pat. No. 6,014,627 operates by using a series of arbitrators, based on geographical location, to keep a trading book of orders (bids and offers) entered into the system by traders. Traders receive market views showing the best bids and offers which are filtered by a Market Distributor according to their ability to deal prices. The arbitrator holds a log of all deals conducted on the system and provides deal information, since the last benchmark, together with bids and offers entered and active in the system, via a city node, which is a local node via which trading banks are connected to the system, to the MRF server 14. This market data is delivered to traders 20 on other systems in XML or other formats over a TCP/IP link via a wide area network 22 and a Conversational Direct Dealing (CDD) server 24 and a Secure Communication Server (SCS) 26. The market data is enhanced with the benchmarks calculated by the MRF 14. The benchmarks are also communicated back to the anonymous trading system for distribution, via the market distributor, to traders trading on the anonymous trading system 10. The benchmarks may be used to calculate the big figure (most significant digits) of the currency rate at the anonymous trading system.

Thus, the market rate feed unit 14 differs from prior art units in that the benchmark calculation algorithm described above is implemented. The MRF 14 calculates benchmarks at predetermined equal intervals over a trading day, for example every second. Thus, the MRF receives the order book from the trading system together with the deals done since the last benchmark, calculates the new benchmark and distributes the benchmark.

In the variant of FIG. 9, benchmarks for some currencies may be calculated from trading information provided from a different source than the anonymous trading system 10. This source 28 may be a different trading system, which, for example has greater liquidity in some currency pairs than trading system 10. The benchmarks for some currency pairs will be calculated from the price and deal data provided from the third party trading system 30 via the third party server 28.

As an alternative, the market rate feed server 14 could be configured to receive bid/offer and deal price information for a given currency pair from both the anonymous trading system 10 and the third party trading system 30.

The invention claimed is:

1. A method on one or more computers of establishing a benchmark price for trades in a instrument at a given time, comprising:
   (a) at least one of the one or more computers receiving, from at least one computerized trading system, prices at which deals in the instrument have been conducted since a previous benchmark price was established;
   (b) at least one of the one or more computers receiving, from at least one computerized trading system, the prices of quotes to buy and sell the instrument at present in the market;
   (c) at least one of the one or more computers calculating a benchmark price based upon: (i) the previous benchmark price; (ii) a weighted measure of deal prices occurring since the previous benchmark price, and (iii) the prices of quotes at present in the market; and
   (d) at least one of the one or more computers repeating steps (a)-(c) every t seconds.

2. A method according to claim 1, further comprising: at least one of the one or more computers calculating a market price from the measure of deal prices and quote prices; and wherein the benchmark is calculated from the market price and the previous benchmark price.

3. A method according to claim 2, wherein calculation of the market prices comprises weighting deal prices according to their size.

4. A method according to claim 3, wherein the weighting of deal prices according to size is in terms of multiples of a minimum deal size.

5. A method according to claim 2, wherein calculation of the market prices comprises weighting deal prices according to their age.

6. A method according to claim 5, wherein deal prices are weighted according to the formula $$W(d_i) = V_i * 2^{-ct}$$

where $V_i$ is the volume of the deal, t is the elapsed time since the previous benchmark, and c is a constant determining the speed at which deals are marked down over time.

7. A method according to claim 2, wherein calculation of the market prices comprises weighting deal prices according to their size and age.

8. A method according to claim 2, wherein the calculation of market prices comprises summing the weights of all deal prices occurring since the previous benchmark.

9. A method according to claim 8, wherein the market price is calculated from a deal price obtained from the arithmetic average of individual deal prices for deals conducted since the previous benchmark was established, weighted by their deal weight.

10. A method according to claim 2, wherein the calculation of market prices comprises summing the weights of all quote prices occurring since the previous benchmark.

11. A method according to claim 10, wherein the summing of weights of all quote prices comprises summing the weights of all bids and all offers occurring since the previous benchmark.

12. A method according to claim 11, wherein the summing of all bids and all offers is adjusted by a constant representing demand.

13. A method according to claim 12, wherein the quote price is derived from the arithmetic average of prices of weighted bids and offers entered into the market since the previous benchmark.

14. A method according to claim 2, wherein the calculation of market price further comprises calculating a quote price scatter for quotes entered into the market since the previous benchmark price was established.

15. A method according to claim 14, wherein the quote price scatter is derived from the standard deviation of quotes prices measured with respect to quote price and quote weight.

16. A method according to claim 2 wherein the Market price is derived from the average of a Quote price determined from quotes in the market and a Deal price determined from deals done since the previous benchmark, each of the Quote price and the Deal price being weighted and scaled by its own weight.

17. A method according to claim 16, wherein calculation of the market price comprises calculation of a Market price weight from the sum of the Deal price weight and the Quote price weight.

18. A method according to claim 16, further comprising at least one of the one or more computers calculating a market price scatter.

19. A method according to claim 18, wherein the market price scatter is derived from the standard deviation of weighted market prices.

20. A method according to claim 2, wherein the benchmark is derived from the market price, a market price weight, the previous benchmark price and a previous benchmark price weight.

21. A method according to claim 20, wherein the weight of the previous benchmark is calculated from the sum of the Market price weight and the last benchmark price weight modified by a time markdown.

22. A method according to claim 1, comprising at least one of the one or more computers calculating a deal price scatter for deals conducted since the previous benchmark price was established.

23. A method according to claim 22, wherein the deal price scatter is derived from the standard deviation of deals measured with respect to deal price and deal weight.

24. A method according to claim 1, comprising at least one of the one or more computers weighting quote prices according to size.

25. A method according to claim 24, wherein the weighting of quote prices according to size is in terms of multiples of a minimum deal size.

26. A method according to claim 1, comprising at least one of the one or more computers weighting quote prices according to age.

27. A method according to claim 1, comprising at least one of the one or more computers weighting quote prices according to their size and age.

28. A method according to claim 1 comprising at least one of the one or more computers weighting quotes according to their distance from the best quote in the market.

29. A method according to claim 1, wherein quote prices are weighted according to the formula: $W(Q_i) = V_i * 2^{-P(Q_i)-B}$ where $V_i$ is the volume of a quote, $P(Q_i)$ is the quote price and B is the best bid or offer depending on whether $Q_i$ is a bid or an offer.

30. A method according to claim 1, wherein the benchmark price is further calculated with respect to a phantom price, wherein the phantom price is equal to the previous benchmark price if no prices are entered into the market since the previous benchmark was established, and zero when prices have been entered into the market since the last benchmark was established.

31. A method according to claim 30, wherein the phantom price has a weight equal to a very small constant.

32. A method according to claim 31, wherein the weight of the phantom price is $0.5*10^{-6}$.

33. A method according to claim 30, wherein the phantom price has a scatter equal to a small constant.

34. A method according to claim 33, wherein the scatter of the phantom price is equal to 1% of the big figure of the instrument being traded.

35. A method according to claim 1, wherein the calculation of the benchmark price further comprises at least one of the one or more computers calculating a benchmark price scatter.

36. A method according to claim 35, further comprising at least one of the one or more computers calculating a benchmark price error.

37. A method according to claim 36, wherein the benchmark price error is the standard error derived from the benchmark scatter and the benchmark price weight.

38. A method on one or more computers of establishing a benchmark price for trades in a instrument at a given time, comprising:
  (a) at least one of the one or more computers receiving from at least one trading system deal price information relating to prices at which deals in the instrument have been conducted since a previous benchmark price was established;
  (b) at least one of the one or more computers calculating, based upon the deal price information:
    (i) a deal price weight;
    (ii) a deal price; and
    (iii) a deal scatter;
  (c) at least one of the one or more computers receiving from the at least one trading system price quote information relating to the prices of quotes at present in the trading system;
  (d) at least one of the one or more computers calculating, based upon the quote price information:
    (i) a quote price weight;
    (ii) a quote price; and
    (iii) a quote price scatter;
  (e) at least one of the one or more computers calculating, based upon the deal price weight, the deal price and the deal price scatter, the quote price weight, the quote price and the quote price scatter:
    (i) a market price weight;
    (ii) a market price; and
    (iii) a market price scatter; and
  (f) at least one of the one or more computers calculating a benchmark price based upon:
    (i) the previous benchmark price; and
    (ii) the market price; and
  (g) at least one of the one or more computers repeating the steps (a) to (f) every t seconds to provide a new benchmark price.

39. A method according to claim 38, further comprising at least one of the one or more computers calculating a benchmark price weight and a benchmark price scatter from the market price weight and the market price scatter and the previous benchmark.

40. A method according to claim 39, comprising at least one of the one or more computers calculating a benchmark error from the benchmark weight and the benchmark scatter.

41. A method according to claim 40, wherein the benchmark price is further calculated from a phantom price, wherein the phantom price is equal to the previous benchmark price if no prices are entered into the market since the previous benchmark was established, and zero when prices have been entered into the market since the last benchmark was established.

42. A method according to claim 41, wherein the benchmark price scatter is further calculated from a phantom benchmark scatter equal to a small constant.

43. A method according to claim 42, wherein the phantom benchmark scatter is equal to 1% of the big figure of the instrument being traded.

44. A method according to claim 39, wherein the benchmark price weight is further calculated from a phantom benchmark price weight equal to a very small constant.

45. A method according to claim 44, wherein the very small constant is $0.5*10^{-6}$.

46. A system comprising one or more computers operable to calculate a benchmark price for a tradable instrument, comprising:
  at least one of the one or more computers comprising a benchmark calculation module that: (a) receives, from a source, bid and offer prices for the instrument in the market and prices of deals for the instrument conducted since a previous benchmark price was established; and (b) periodically calculates benchmark prices therefrom based on:
    (i) a previous benchmark price;
    (ii) the bid and offer prices; and
    (iii) the deal prices,
  the benchmark calculation module including a module for calculating a weight and scatter of the benchmark prices; and a benchmark price distributor for distributing the calculated benchmark prices to third parties.

47. A system according to claim 46, wherein the benchmark price distributor includes a server for distributing prices across a network.

48. A system according to claim 47, wherein the network is a wide area network such as the Internet.

49. A system according to claim 46, wherein the benchmark price distributor further receives benchmarks for at least one further fungible instrument from a third party source and distributes the third party benchmarks with the calculated benchmarks.

50. A system according to claim 46 wherein the benchmark calculation module includes a module for receiving bid, offer and deal prices from a further trading system;

and wherein the benchmark calculation modules calculates benchmarks from the bid, offer and deal prices received from the trading system and the further trading system.

* * * * *